(12) United States Patent
Khabashesku et al.

(10) Patent No.: US 7,601,421 B2
(45) Date of Patent: Oct. 13, 2009

(54) FABRICATION OF CARBON NANOTUBE REINFORCED EPOXY POLYMER COMPOSITES USING FUNCTIONALIZED CARBON NANOTUBES

(75) Inventors: Valery N. Khabashesku, Houston, TX (US); Jiang Zhu, Houston, TX (US); Haiqing Peng, Houston, TX (US); Enrique V. Barrera, Houston, TX (US); John L. Margrave, Bellaire, TX (US); Mary Lou Margrave, legal representative, Bellaire, TX (US)

(73) Assignee: William Marsh Rice University, Houston, TX (US)

(*) Notice: Subject to any disclaimer, the term of this patent is extended or adjusted under 35 U.S.C. 154(b) by 518 days.

(21) Appl. No.: 10/559,905

(22) PCT Filed: Jun. 16, 2004

(86) PCT No.: PCT/US2004/019188

§ 371 (c)(1),
(2), (4) Date: Dec. 8, 2005

(87) PCT Pub. No.: WO2005/028174

PCT Pub. Date: Mar. 31, 2005

(65) Prior Publication Data

US 2006/0166003 A1    Jul. 27, 2006

Related U.S. Application Data

(60) Provisional application No. 60/478,936, filed on Jun. 16, 2003, provisional application No. 60/490,556, filed on Jul. 28, 2003.

(51) Int. Cl.
- B32B 27/38 (2006.01)
- B32B 27/04 (2006.01)
- B32B 27/18 (2006.01)
- B32B 27/20 (2006.01)
- C08L 63/00 (2006.01)
- C08K 3/04 (2006.01)

(52) U.S. Cl. ............ 428/297.4; 523/440; 523/468; 977/742; 977/745; 977/746; 977/748; 977/750; 977/752; 977/753; 977/778

(58) Field of Classification Search ............... None
See application file for complete search history.

(56) References Cited

U.S. PATENT DOCUMENTS

| | | | |
|---|---|---|---|
| 5,374,415 A | 12/1994 | Alig et al. | |
| 6,368,569 B1* | 4/2002 | Haddon et al. | 423/460 |
| 6,426,134 B1 | 7/2002 | Lavin et al. | |
| 6,645,455 B2 | 11/2003 | Margrave et al. | |
| 2003/0211028 A1 | 11/2003 | Smalley et al. | |
| 2004/0223900 A1 | 11/2004 | Khabashesku et al. | |
| 2006/0047052 A1 | 3/2006 | Barrera et al. | |
| 2006/0155043 A1* | 7/2006 | Johnson et al. | 524/495 |
| 2007/0259994 A1* | 11/2007 | Tour et al. | 523/333 |
| 2008/0048364 A1* | 2/2008 | Armeniades et al. | 264/328.1 |

FOREIGN PATENT DOCUMENTS

| | | |
|---|---|---|
| WO | WO 02/060812 | 8/2002 |
| WO | WO 03/080513 | 10/2003 |
| WO | WO 2005/012171 | 2/2005 |

OTHER PUBLICATIONS

Iijima, "Helical microtubules of graphitic carbon," 354 Nature (1991), pp. 56-58.
Iijima et al., "Single-shell carbon nanotubes of 1-nm diameter," 363 Nature, (1993), pp. 603-605.
Baughman et al., "Carbon Nanotubes-the Route Toward Applications," 297 Science (2002), pp. 787-792.
Berber et al., "Unusually High Thermal Conductivity of Carbon nanotubes", 84(20) Phys. Rev. Lett. (2000), pp. 4613-4616.
Lourie et al., "Evaluation of Young's modulus of carbon nanotubes by micro-Raman spectroscopy", 13 J. Mat. Res. (1998), pp. 2418-2422.
Walters et al., "Elastic strain of freely suspended single-wall carbon nanotube ropes," 74 Appl. Phys. Lett. (1999), pp. 3803-3805.
Andrews, R., et al., "Nanotube composite carbon fibers," 75 Appl. Phys. Lett. (1999), pp. 1329-1331.
Barrera, "Key Methods for Developing Single-Wall Nanotube Composites," 52 Jom (2000), pp. 38-42.
Ausman et al., "Organic Solvent Dispersions of Single-Walled Carbon Nanotubes: Toward Solutions of Pristine Nanotubes", 104 J. Phys. Chem. B. (2000), pp. 8911-8915.
Bahr et al., "Dissolution of small diameter single-wall carbon nanotubes in organic solvents," Chem. Commun. (2001), pp. 193-194.
Lourie, et al., "Transmission electron microscopy observations of fracture of single-wall carbon nanotubes . . . ", 73 Appl. Phys. Lett. (1998), pp. 3527-3529.
Geng et al., "Fabrication and Propertiesof Composites of Poly(ethylene oxide) . . . ", 14 Adv. Mater. (2002), pp. 1387-1390.

(Continued)

Primary Examiner—Michael J Feely
(74) Attorney, Agent, or Firm—Winstead PC

(57) ABSTRACT

The present invention is directed to methods of integrating carbon nanotubes into epoxy polymer composites via chemical functionalization of carbon nanotubes, and to the carbon nanotube-epoxy polymer composites produced by such methods. Integration is enhanced through improved dispersion and/or covalent bonding with the epoxy matrix during the curing process. In general, such methods involve the attachment of chemical moieties (i.e., functional groups) to the sidewall and/or end-cap of carbon nanotubes such that the chemical moieties react with either the epoxy precursor(s) or the curing agent(s) (or both) during the curing process. Additionally, in some embodiments, these or additional chemical moieties can function to facilitate dispersion of the carbon nanotubes by decreasing the van der Waals attractive forces between the nanotubes.

71 Claims, 18 Drawing Sheets

OTHER PUBLICATIONS

Schadler et al., "Load transfer carbon nanotube epoxy composites", 73 (26) Appl. Phys. Lett. (1998), pp. 3842-3844.
Ajayan et al., "Single-Walled Carbon nanotube-Polymer Composites: Strength and Weaknesses", 12(10) Adv. Mater. (2000), pp. 750-753.
Sandler et al, "Development of a dispersion process for carbon nanotubes in an epoxy matrix and the resulting electrical properties", 40 Polymer (1999), pp. 5967-5971.
Vaccarini et al., "Rerinforcement of an Epoxy Resin by Single Walled Nanotubes", 544 AIP Conf. Proc. (2000), pp. 521-525.
Gong et al., "Surfactant-Assisted Processing of Carbon Nanotube/Polymer Composites", 12 Chem. Mater. (2000), pp. 1049-1052.
Spindler-Ranta et al., "Carbon Nanotube Reinforcement of a Filament Winding Resin", SAMPE 2002 Symposium & Exhibition (2002).
Biercuk et al., "Carbon nanotube composites for thermal management", 80 (15) Appl. Phys. Lett. (2002), pp. 2767-2769.
Tiano et al., "Functionalization of Single-Wall nanotubes for Improved Structural Composites", 32nd SAMPE Conf. (2000).
Calvert, P., "Nanotube composites: A recipe for strength," 399 Nature (1999), pp. 210-211.
Garg et al., "Effect of chemical functionalization on the mechanical properties of carbon nanotubes", 295 Chem. Phys. Lett. (1998), pp. 275-278.
Frankland et al., "Molecular Simulation of the Influence of Chemical Cross-Links on the Shear Strength of Carbon nanotube . . . ", 106 J. Phys. Chem. B. (2002), pp. 3046-3048.
Liu et al., "Fullerene Pipes," 280 Science (1998), pp. 1253-1256.
Chen et al., "Solution Properties of Single-Walled Carbon Nanotubes," 282 Science (1998), pp. 95-98.
Bahr et al., "Covalent chemistry of single-wall carbon nanotubes," 12 J. Mater. Chem. (2002), pp. 1952-1958.
Holzinger et al., "Sidewall Functionalization of Carbon Nanotubes," 40 Angew. Chem. Int. Ed. (2001), pp. 4002-4005.
Khabashesku et al., "Fluorination of Single-Wall Carbon Nanotubes and Subsequent Derivatization Reactions," 35 Acc. Chem. Res. (2002), pp. 1087-1095.
Shaffer et al., "Dispersion and Packing of Carbon Nanotubes," 36(11) Carbon (1998), pp. 1603-1612.
Hamon et al., "Dissolution of Siingle-Walled Carbon Nanotubes," 11(10) Adv. Mater. (1999), pp. 834-840.
Chen, J., et al., "Dissolution of Full-Length Single-Walled Carbon Nanotubes", 105 J. Phys. Chem. B (2001), pp. 2525-2528.
Riggs, J. E., et al., "Strong Luminescence of Solubilized Carbon Nanotubes", 122 J. Am. Chem. Soc. (2000), pp. 5879-5880.
Sun et al., "Soluble Dendron-Functionalized Carbon Nanotubes: Preparation, Characterization, and Properties", 13 Chem. Mater. (2001), pp. 2864-2869.
Ebbesen, "Carbon Nanotubes", 24 Annu. Rev. Mater. Sci. (1994), pp. 235-264.
Thess et al., "Crystalline Ropes of Metallic Carbon Nanotubes", 273 Science (1996), pp. 483-487.
Vander Wal, "Flame synthesis of Fe catalyzed single-walled carbon nanotubes and Ni catalyzed nanofibers . . . ", 349 Chem. Phys. Lett. (2001), pp. 178-184.
Hafner et al., "Catalytic growth of single-wall carbon nanotubes from metal particles," 296 Chem. Phys. Lett. (1998), pp. 195-202.
Cheng, et al., "Bulk morphology and diameter distribution of single-walled carbon naotubes synthesized by catalytic decomposition of hydrocarbons", 289 Chem. Phys. Lett. (1998), pp. 602-610.

Nikolaev et al., "Gas-phase catalytic growth of single-walled carbon nanotubes from carbon monoxide," 313 Chem. Phys. Lett. (1999), pp. 91-97.
O'Connell et al., "Band Gap Fluorescence from Individual Single-Walled Carbon Nanotubes", 297 Science (2002), pp. 593-596.
Bachilo et al., "Structure-Assigned Optical Spectra of Single-Walled Carbon Nanotubes", 298 Science (2002), pp. 2361-2366.
Strano, et al., "Electronic Structure Control of Single-Walled Carbon Nanotuve Functionalization," 301, Science, (2003), pp. 1519-1522.
Chiang et al., "Purification and Characterization of Single-Wall Carbon Nanotubes", 105 J. Phys. Chem. B (2001), pp. 1157-1161.
Chiang et al., Purification and Characterization of Single-Wall Carbon Nanotubes (SWNTs) Obtained from the Gas-Phase Decomposition of Co (HiPco Process), 105 J. Phys. Chem. B (2001), pp. 8297-8301.
Gu et al., "Cutting Single-Wall Carbon Nanotubes through Fluorination," 2 (9) Nano Lett. (2002), pp. 1009-1013.
Zhu, J., et al., "Improving the Dispersion and Integration of Single-Walled Carbon Nanotubes in Epoxy Composites throught Functionalization," 3(8), Nano Lett., (2003), pp. 1107-1113.
Zhang et al., "Sidewall Functionalization of Single-Walled Carbon nanotubes with Hydroxyl Group-Terminated Moieties", 16 Chem. Mater. (2004), pp. 2055-2061.
Mickelson et al., "Solvation of Fluorinated Single-Wall Carbon Nanotubes in Alcohol Solvents," 103, J. Phys. Chem. B, (1999), pp. 4318-4322.
Stevens et al., "Sidewall Amino-Functionalization of Single-Walled Carbon Nanotubes through Fluorination and Subsequent Reactions with Terminal Diamines", 3 Nano Lett. (2003), pp. 331-336.
Bronikowski et al., "Gas-phase production of carbon single-walled nanotubes from carbon monoxide via the HiPco process: A parametric study," 19 J. Vac. Sci. Technol. A (2001), pp. 1800-1805.
Mickelson et al., "Fluorination of single-wall carbon nanotubes", 296 Chem. Phys. Lett. (1998), pp. 188-194.
Yao et al., "Structure and oxidation patterns of carbon nanotubes", 13 J. Mater. Res. (1998), pp. 2432-2437.
Rao et al., "Effect of van der Waals Interactions on the Raman Modes in Single Walled Carbon Nanotubes", 86(17) Phys. Rev. Lett. (2001), pp. 3895-98.
May, C. A., Ed.," Epoxy Resins: Chemistry and Technology", Marcel Dekker, Inc., Publisher, NY (1988).
Kozlowski et al., "X-Ray Photoelectron Spectroscopic Studies of Carbon Fiber Surfaces . . . ", 25(6) Carbon (1987), pp. 751-760.
Jones, "The Chemistry of Carbon Fibre Surfaces and Its Effect . . . ", 42 Compos. Sci. Tech. (1991), pp. 275-298.
Yu et al., "Tensile Loading of Ropes of Single Wall Carbon Nanotubes and Their Mechanical Properties", 84(24) Phys. Rev. Lett. (2000), pp. 5552-5555.
Li et al., "Tensile strength of single-walled carbon nanotubes directly measured from their macroscopic ropes", 77 Appl. Phys. Lett. (2000), pp. 3161-3163.
Peng et al., "Sidewall Carboxylic Acid Functionalization of Single-Walled Carbon Nanotubes," 125 J. Am. Chem. Soc. (2003), pp. 15174-15182.
Agarwal et al., "Analysis and Performance of Fiber Composites", John Wiley & Sons, Inc, New York, (1990).
Johnston, "Toughened Composites", ASTM Special Technical Publication 937 (PCN 04-937000-33) (1985).
Nielsen et al., Mechanical Properties of Polymers and Composites, 2nd Ed., Marcel Dekker, Inc., Ny (1994).

* cited by examiner

FABRICATION OF CARBON NANOTUBE REINFORCED EPOXY POLYMER COMPOSITES USING FUNCTIONALIZED CARBON NANOTUBES

CROSS REFERENCE TO RELATED APPLICATIONS

This Application claims priority to U.S. Provisional Patent Application Ser. Nos. 60/478,936 and 60/490,556, filed Jun. 16, 2003 and Jul. 28, 2003, respectively. The present application is related to commonly—U.S. patent application Ser. No. 10/149,216 entitled Oriented Nanofibers Embedded in Polymer Matrix filed Dec. 7, 2000, incorporated by reference. The present application is related to commonly-assigned patent application filed concurrently herewith, entitled, "Sidewall Functionalization of Carbon Nanotubes with Hydroxyl-Terminated Moieties," and incorporated by reference herein.

This invention was made with support from the Office of Naval Research, Grant Number N00014-03-1-0296; and the Robert A. Welch Foundation, Grant Number C-1494.

FIELD OF THE INVENTION

The present invention relates generally to reinforced epoxy polymer composites, and specifically to methods of integrating carbon nanotubes into epoxy polymer matrices. This invention also relates to the development of thermoset fiber reinforced composites enabled by nanotube and functionalized nanotube integration.

BACKGROUND

Carbon nanotubes (CNTs), comprising multiple concentric shells and termed multi-wall carbon nanotubes (MWNTs), were discovered by Iijima in 1991 [Iijima, S. *Nature* 1991, 354, 56]. Subsequent to this discovery, single-wall carbon nanotubes (SWNTs), comprising a single graphene rolled up on itself, were synthesized in an arc-discharge process using carbon electrodes doped with transition metals [Iijima, S.; Ichihashi, T. *Nature* 1993, 363, 603; and Bethune, D. S.; Kiang, C. H.; de Vries, M. S.; Gorman, G.; Savoy, R.; Vasquez, J; Beyers, R. *Nature* 1993, 363, 605]. These carbon nanotubes (especially SWNTs) possess unique mechanical, electrical, and thermal properties, and such properties make them attractive for the next generation of composite materials. Carbon nanotubes are expected to serve as mechanical reinforcements for lightweight composite systems with further promise of multifunctionality. See Baughman, R. H.; Zakhidov, A. A.; de Heer, W. A. *Science* 2002, 297, 787. For instance, SWNTs possess a tensile strength of 50-100 GPa and a modulus of 1-2 TPa-five and ten times greater than steel, respectively, at just one sixth the weight. See Berber, S.; Kwon, Y. K.; Tomanek, D. *Phys. Rev. Lett.*, 2000, 84, 4613; Lourie, O.; Wagner, H. D. *J. Mat. Res.* 1998, 13, 2418; Walters, D. A.; Ericson, L. M.; Casavant, M. J.; Liu, J.; Colbert, D. T.; Smith, K. A.; Smalley, R. E. *Appl. Phys. Lett.* 1999, 74, 3803; and Andrews, R.; Jacques, D.; Rao, A. M.; Rantell, T.; Derbyshire, F.; Chen, Y.; Chen, J.; Haddon, R. C. *Appl. Phys. Lett.* 1999, 75, 1329. However, the potential of using nanotubes as polymer composite reinforcements has, heretofore, not been realized, mainly because of the difficulties in processing and the limitation on load transfer. Several fundamental processing challenges must be overcome in order to fully enable the reinforcement by nanotubes. See Barrera, E. V. *J. Mater.*, 2000, 52, 38. Due to the intrinsic van der Waals attraction the nanotubes have to each other, and by virtue of their high aspect ratio (e.g., ~1:1000), nanotubes are typically held together as bundles and ropes, that have very low solubility in most solvents. See Ausman, K D.; Piner, R.; Lourie, O.; Ruoff, R. S. *J. Phys. Chem. B.* 2000, 104, 8911; and Bahr, J. L.; Mickelson, E. T.; Bronikowski, M. J.; Smalley, R. E.; Tour, J. M. *Chem. Commun.* 2001, 193. The dispersion property has become more important when nanotubes are blended with polymers. Nanotubes tend to remain as entangled agglomerates and homogeneous dispersion is not easily obtained. Furthermore, due to the atomically smooth non-reactive surface of nanotubes, lack of interfacial bonding limits load transfer from the matrix to nanotubes. In this situation, nanotubes are typically pulled from the matrix, rather than fractured, and play a limited reinforcement role. See Lourie, O.; Wagner, H. D. *Appl. Phys. Lett.* 1998, 73, 3527. Additional processing difficulties for nanotube reinforced epoxy polymer composites come from the significant increase of viscosity when the nanotubes are added directly into the epoxy.

A number of recent research efforts have used nanotubes for polymer composites reinforcement. See Geng, H.; Rosen, R.; Zheng, B.; Shimoda, H.; Fleming, L.; Liu, J.; Zhou, O. *Adv. Mater* 2002, 14, 1387; Schadler, L. S.; Giannaris, S. C.; Ajayan, P. M. *Appl. Phys. Lett.* 1998, 73 (26) 3842; Ajayan, P.; Schadler, L.; Giannaries, C.; Rubio, A. *Adv. Mater.* 2000, 12, 750; Sandler, J.; Shaffer, M. S. P.; Prasse, T.; Bauhofer, W.; Schulte, K.;. Windle, A. H. *Polymer* 1999, 40, 5967; Vaccarini, L.; Desarmot, G.; Almairac, R.; Tahir, S.; Goze, C.; Bernier, P. *AIP Conf. Proc.* 2000, N. 544, 521; Gong, X.; Liu, J.; Baskaran, S.; Voise, R. D.; Young, J. S. *Chem. Mater.* 2000, 12, 1049; Spindler-Ranta, S.; Bakis, C. E. *SAMPE* 2002 *Symposium & Exhibition,* 2002; Biercuk, M. J.; Llaguno, M. C.; Radosavljevic, M. *Appl. Phys. Lett.* 2002, 80 (15). 2767; and Tiano, T. et al, Roylance, M.; Gassner, J. $32^{nd}$ *SAMPE Conf.* 2000, p. 192. Some strategies have been proposed to overcome the various barriers to dispersion, including the use of ultrasonication, high shear mixing, surfactant addition, chemical modification through functionalization, wrapping the tubes with polymer chains, and various combinations of these. However, to date, only marginal success for nanotube reinforced epoxy composites has been realized, mainly because of the above-mentioned barrier to dispersion. Note that, dispersion has been more readily accomplished in thermoplastic polymer composites [Geng, H.; Rosen, R.; Zheng, B.; Shimoda, H.; Fleming, L.; Liu, J.; Zhou, O. *Adv. Mater.* 2002, 14, 1387], where stepwise dispersion was aided by high shear mixing, incipient wetting, and elongational flow. This dispersion is also described in the commonly assigned and incorporated U.S. patent application Ser. No. 10/149,216 entitled Oriented Nanofibers Embedded in Polymer Matrix.

Among polymer composites, high strength epoxy systems are very important materials, finding use in aerospace, electronics, and many other industrial applications. Consequently, carbon nanotube reinforced epoxy systems hold the promise of delivering superior composite materials with high strength, and lightweight and multifunctional features-if the problems of dispersal and integration can be overcome.

Purified multi-walled nanotubes (MWNTs) were first mixed and ultrasonically dispersed in epoxy resins by Ajayan and co-workers [Schadler, L. S.; Giannaris, S. C.; Ajayan, P. M. *Appl. Phys. Lett.* 1998, 73 (26) 3842]. The Raman spectroscopic response to tension and compression in cured epoxy composites, however, showed poor load transfer behavior, especially under tension. A later study, using single-walled nanotubes (SWNTs) at higher concentrations (e.g., 5 wt %) also showed that the nanotubes were slipping within the bundles and falling apart [Ajayan, P.; Schadler, L.; Giannaries, C.; Rubio, A. *Adv. Mater.* 2000, 12, 750]. Sandier et al. reported the difficulty in breaking up the entanglements of the nanotubes, although ultrasonication and the intense stirring process was found to improve the dispersion of the nanotubes [Sandler, J.; Shaffer, M. S. P.; Prasse, T.; Bauhofer, W.; Schulte, K.;. Windle, A. H. Polymer 1999, 40, 5967]. Even on the millimeter scale, the distribution of nanotubes in such blends is not uniform within the epoxy. Vaccarini et al. [Vaccarini, L.; Desarmot, G.; Almairac, R.; Tahir, S.; Goze, C.; Bernier, P. *AIP Conf. Proc.* 2000, N. 544, 521] prepared several epoxy blends and composites with high concentrations (up to 35 wt %) of SWNTs. In this case, a linear increase of the Young's modulus with the weight percentage of the SWNTs was observed. These authors also pointed that the possible sliding of the SWNTs within the ropes and the bending of ropes limited any further mechanical enhancement since alignment was not produced. Biercuk et al. [Biercuk, M. J.; Llaguno, M. C.; Radosavljevic, M. *Appl. Phys. Lett.* 2002, 80 (15). 2767] reported a 125% thermal conductivity enhancement and a Vickers hardness increase by a factor of 3.5 when 2 wt % of SWNTs were added into epoxy.

Gong et al. [Gong, X.; Liu, J.; Baskaran, S.; Voise, R. D.; Young, J. S. *Chem. Mater.* 2000, 12, 1049] used surfactants as wetting agents to improve dispersion of nanotubes and observed an improvement in both the mechanical and thermal properties of the nanotube epoxy composites. Sean et al. [Spindler-Ranta, S.; Bakis, C. E. SAMPE 2002 *Symposium & Exhibition,* 2002] also prepared nanotube epoxy composites using a combination of surfactant addition and ultrasonic assistance for suspending the SWNTs in a large amount of acetone. However, no improvement of the modulus and the compressive strength for a filament wound composite with 1 wt % nanotube addition was observed. Microscopy revealed a non-uniform dispersion of nanotubes in the epoxy.

Despite the above-mentioned efforts, however, due to poor dispersion and weak interaction between pristine nanotubes and the surrounding matrix, the reinforcing role of high strength nanotubes in polymer composites is still quite limited. Chemical modification and functionalization have been shown to be feasible and effective means to improve solubility and dispersion of nanotubes. In addition, functionalized nanotubes can provide bonding sites to the polymer matrix so that the load can be transferred to the nanotubes to prevent separation between the polymer surfaces and nanotubes. See Calvert, P. *Nature* 1999, 399, 210. Theoretical calculations have predicted that even a high degree of sidewall functionalization will degrade the mechanical strength of SWNTs by only 15%. See Garg, A,; Sinnott, S. B. *Chem. Phys. Lett.* 1998, 295, 275.

A molecular simulation has suggested that the shear strength of a polymer-nanotube interface can be increased by over an order of magnitude with the introduction of even a relatively low density of chemical bonds between the single-walled nanotubes and matrix [S. J. V. Frankland, A. Caglar, D. W. Brenner, and M. Griebel, *J. Phys. Chem. B.* 2002, 106, 3046]. The calculation also predicted a negligible change in modulus for a (10,10) nanotube with the functionalization of at least up to 10% of the carbon atoms.

There exist numerous chemical routes for functionalization of nanotubes involving the covalent and/or non-covalent attachment of various functional groups to either nanotube end-caps or sidewalls. See Liu et al., Science 1998, 280, 1253; Chen et al., Science 1998, 282, 95; Bahr, J. L.; Tour, J. M. *J. Mater. Chem.* 2002, 12, 1952; Holzinger et al., *Angew. Chem. Int. Ed.* 2001, 40, 4002; Khabashesku et al., *Acc. Chem. Res.* 2002, 35, 1087.

The end-caps of SWNTs can be opened under oxidizing conditions and terminated with the oxygenated functionalities including carboxylic, carbonyl and hydroxyl groups [Liu et al., Science 1998, 280, 1253; Chen et al., *Science* 1998, 282, 95]. Oxidized nanotubes have better solubility and can form a well-dispersed electrostatically stabilized colloids in water and ethanol. See Shaffer, M. S. P.; Fan, X; Windle, A. H. Carbon, 1998, 36(11), 1603. The presence of carboxylic acid functionalities offers opportunities for further derivatization reactions with a number of molecules. For example, oxidizing acid treated SWNTs can be further derivatized by reactions with thionyl chloride and long-chain amines [Hamon, M. A.; Chen, J.; Hu, H.; Chen, Y. S.; Itkis, M. E.; Rao, A. M.; Eklund, P. C.; Haddon, R. C. *Adv. Mater.* 1999, 11, 834; Chen, J.; Hamon, M. A.; Hu, H.; Chen, Y.; Rao, A. M.; Eklund, P. C.; Haddon, R. C. *Science,* 1998, 282, 95; Chen, J.; Rao, A. M.; Lyuksyutov, S.; Itkis, M. E.; Hamon, M. A.; Hu, H.; Cohn, R. W.; Eklund, P. C.; Colbert, D. T.; Smalley, R. E.; Haddon, R. C. *J. Phys. Chem. B* 2001, 105, 2525] or by esterification [Riggs, J. E.; Guo, Z.; Carroll, D. L.; Sun, Y.-P. *J. Am. Chem. Soc.* 2000, 122, 5879; Sun, Y.-P.; Huang, W.; Lin, Y.; Fu, K.; Kitaigorodsky, A.; Riddle, L. A.; Yu, Y. J.; Carroll, D. L. *Chem. Mater.* 2001, 13, 2864].

Sidewall functionalization of CNTs, like end-cap functionalization, offer opportunity, if the right functional moiety is attached, to covalently integrate into epoxy polymer matrices, but they offer far more opportunities for such integration by virtue of having more functional groups with which to interact. The functionalization can be used to get better dispersion, to get specific interactions between the materials in the composite system, and/or to promote alignment.

The use of functionalized nanotubes for epoxy composite fabrication has been reported by Tiano et al. See Tiano, T. et al, Roylance, M.; Gassner, J. 32$^{nd}$ *SAMPE Conf.* 2000, p. 192. Here, the sidewall surfaces of the nanotubes were ostensibly functionalized via free-radical polymerization of poly(methyl methacrylate) using AIBN as a catalyst. It was presumed that the CNTs would form free radical weak spots that would then react with the methyl methacrylate monomers. These "functionalized" CNTs were then mixed into an epoxy resin and allowed to cure. With a 1 wt % load of functionalized nanotubes in the epoxy, a significant improvement in the mechanical properties was observed: an 11% increase in stress and a 21% increase in modulus over the unfilled epoxy was demonstrated, which differs markedly from the observed sharp decrease of these parameters when using pristine nanotubes.

As a result of the foregoing, it should be understood that methods for exploiting end-cap and/or sidewall functionalized carbon nanotubes to realize better dispersion in, and/or better covalent bonding with, epoxy matrices will significantly advance the integration of carbon nanotubes into epoxy polymer composites and subsequently provide enhancement in the properties of such composites, allowing nanotube-epoxy systems to realize their full potential.

SUMMARY

The present invention is directed to methods of integrating carbon nanotubes (CNTs) into epoxy polymer composites via chemical functionalization of carbon nanotubes, and to the carbon nanotube-epoxy polymer composites produced by such methods. The Nanotube integration via functionalization can also be achieved in fiber reinforced composite systems where fibers are a variety of glass, carbon, boron or other fiber types. Integration is enhanced through improved dispersion and/or covalent bonding with the epoxy matrix during the curing process. In general, such methods involve the attachment of chemical moieties (i.e., functional groups) to the sidewall and/or end-cap of carbon nanotubes such that the attached chemical moieties react with either the epoxy precursor(s) or the curing agent(s) (or both) during the curing process. Additionally, in some embodiments, these or additional chemical moieties can function to facilitate dispersion of the carbon nanotubes by decreasing the van der Waals attractive forces between the nanotubes.

In general, methods of the present invention comprise the steps of: 1) dispersing functionalized CNTs in a solvent to form a dispersion; 2) adding epoxy resin to the dispersion to form a mixture; 3) removing solvent from the mixture to form a largely solvent-free mixture; 4) adding a curing agent to the solvent-free mixture; and 5) curing the solvent-free mixture to form a CNT-epoxy composite, wherein the CNTs are dispersed and integrated into the epoxy matrix.

In some embodiments of the present invention, carbon nanotubes are fluorinated to yield sidewall-functionalized fluorinated carbon nanotubes. In some embodiments, these carbon nanotubes are first oxidized to yield carboxylic acid groups on their ends, which are subsequently uncapped. Upon fluorinating the sidewall of the carbon nanotubes, these carboxylic acid groups remain attached to the carbon nanotube ends yielding a heterogeneously-functionalized carbon nanotube species. The flourination is used as a step to produce small ropes to single nanotubes (unroped) though other intermediate steps that achieve the same could also be used. In some embodiments, these fluorinated carbon nanotubes, which have increased dispersability in solvents like N,N-dimethylformamide (DMF), tetrahydrofuran (THF), and alcohols, are dispersed directly with the epoxy precursors (e.g., diglycidyl ether of bisphenol A (DGEBA)) and curing agents (e.g., diamines). Curing agents that are primary and secondary amines, and diamines thereof, will react with the fluorines on the CNT sidewall and form C—N bonds to the nanotube sidewall, eliminating HF in the process. This is of some importance, in that HF can be eliminated and does not remain in the composite. When such curing agents are diamines, these diamines can react with the fluorine on the nanotube sidewall to yield CNTs with amine groups dangling from the sidewalls. These dangling amine groups can then react directly with the epoxide rings on the epoxy precursors (resins), providing covalent integration with the epoxy as it forms. When the fluorinated CNTs also have carboxylic acid groups on their ends, these species can react directly with the epoxide rings to form esters. Alternatively, the fluorinated CNTs can be reacted with a curing agent, or any other suitable amine, prior to addition of the epoxy precursor(s).

In some embodiments of the present invention, organic acyl peroxides of dicarboxylic acids, such as HO(O)C—$(CH_2)_n$—C(O)O—O—(O)C—$(CH_2)_n$—C(O)OH (where if n=2 it is succinic acid peroxide, and if n=3 it is glutaric acid peroxide), are heated with carbon nanotubes to form free radicals of the type HO(O)C—$(CH_2)_n$ which then add covalently to the nanotube sidewall. Reacting these sidewall carboxylic acid functionalities with a chlorinating agent like thionyl chloride ($SOCl_2$) yields acyl chloride functionalities (—$(CH_2)_n$—C(O)Cl) on the nanotube sidewall. These acyl chlorides can then react directly with the epoxy curing agents, or they can be first reacted with a suitable amine (e.g., a diamine) and then reacted with the epoxy precursor.

In still other embodiments, hydroxyl terminated functional groups are attached to the sidewalls of CNTs. This is accomplished by reacting sidewall fluorinated CNTs with metal salts such as MO$(CH_2)_n$CH(R)OH, where M=Li, Na, or K, and R=an organic linkage, and wherein the metal salt forms upon addition of MOH to dialcohol HO$(CH_2)_n$CH(R)OH. In some embodiments, the dialcohol is bisphenol-A. Additionally or alternatively, in some embodiments, sidewall fluorinated CNTs are reacted with hydroxylated amines such as HN(R)$(CH_2)_n$OH. Once hydroxyl-terminated moieties have been appended to the CNTs, epichlorohydrin can be reacted with these hydroxyl-functionalized CNTs to impart them with epoxide groups. These epoxide groups, when the functionalized CNT is dispersed with epoxy precursor, can then react with curing agents just like the epoxy precursor-providing integration of the CNTs into the epoxy matrix.

Functionalization of carbon nanotubes, according to the present invention, permits control over the interactions of the carbon nanotubes with the polymer matrix through a variety of possible organic groups attached to the nanotubes. Such functionalization enhances dispersion by both attenuating the van der Waals attractive forces between CNTs and enhancing the affinity of the CNTs for organic solvents. Furthermore, covalent integration is realized by reaction of the functional groups on the CNTs with epoxy precursor before and/or during the curing process. Dispersion is enhanced because untangling and unroping is achieved and it is maintained since the flourination limits the nanotubes from roping again.

As a result of such novel methods, new approaches to the design and engineering of nanotube-reinforced polymer composites. The most effective methods utilizing this approach will be based on incorporating nanotubes into matrices via chemical bonding so that they become an integral part of the crosslinked (epoxy or other) polymer structure, rather than just separate fillers. The methods of the present invention provide an effective load transfer within the CNT-epoxy composite through robust chemical bonding and make good use of nanotubes for the enhancement of mechanical properties of such composites. Furthermore, such composites can also exploit the thermal and electronic properties of nanotubes to provide for multifunctional CNT-epoxy composites with heretofore unrealized properties and applications.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention is directed to methods of integrating carbon nanotubes (CNTs) into epoxy polymer composites via chemical functionalization of carbon nanotubes, and to the carbon nanotube-epoxy polymer composites produced by such methods. Integration is enhanced through improved dispersion and/or covalent bonding with the epoxy matrix during the curing process. The scope of the invention includes epoxy composites that have other reinforcements as well. In general, such methods involve the attachment of chemical moieties (i.e., functional groups) to the sidewall and/or end-cap of carbon nanotubes such that the chemical moieties react with either the fibersystem, the epoxy precursor(s) or the curing agent(s) (or some combination) during the curing process. This aspect serves well for achieving unroped and untangled nanotubes. Additionally, in some embodiments, these or additional chemical moieties can function to facilitate dispersion of the carbon nanotubes by decreasing the van der Waals attractive forces between the nanotubes. The sidewall and/or end-tip functional groups on carbon nanotubes reacted in situ with epoxy resin and amine curing agent produce a copolymer with considerable improvement in mechanical properties over that of the native epoxy polymer.

While the making and/or using of various embodiments of the present invention are discussed below, it should be appreciated that the present invention provides many applicable inventive concepts that may be embodied in a variety of specific contexts. The specific embodiments discussed herein are merely illustrative of specific ways to make and/or use the invention and are not intended to delimit the scope of the invention.

Figure 1:
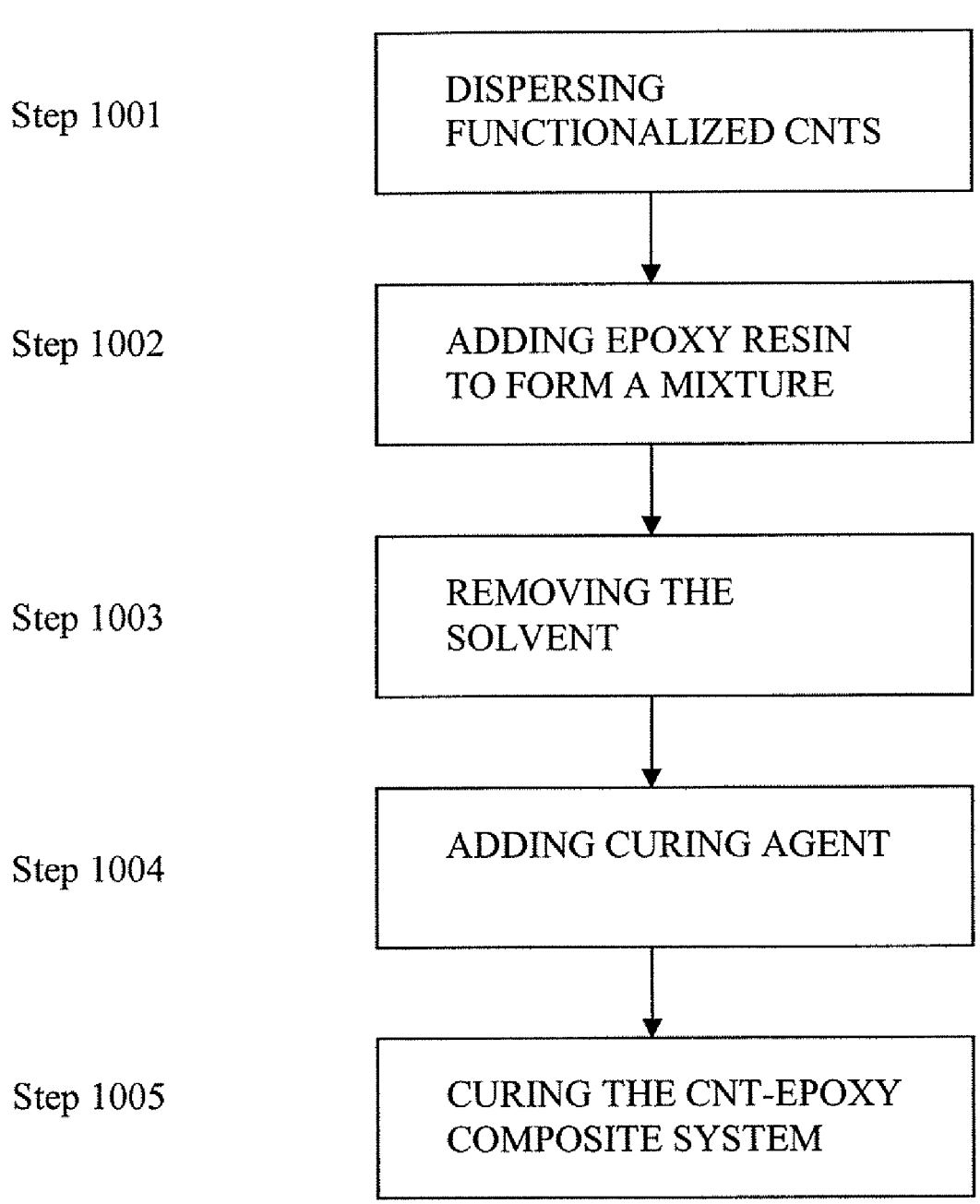
FIG. 1 illustrates, in schematically-general terms, methods for integrating epoxy matrices with carbon nanotubes in accordance with the present invention, (note that nanotubes could be various fibers, that the system is not limited to epoxy systems, that the nanotubes could be in the curing agent and that curing could occur simultaneously or in steps)

Referring to FIG. 1, methods of the present invention generally comprise the steps of: (1001) dispersing functionalized CNTs in a solvent to form a dispersion; (1002) adding epoxy resin to the dispersion to form a mixture; (1003) removing solvent from the mixture to form a largely solvent-free mixture; (1004) adding a curing agent to the solvent-free mixture; and (1005) curing the solvent-free mixture to form a CNT-epoxy composite, wherein the CNTs are dispersed and integrated into the epoxy matrix.

Carbon nanotubes (CNTs), according to the present invention, include, but are not limited to, single-wall carbon nanotubes (SWNTs), multi-wall carbon nanotubes (MWNTs), double-wall carbon nanotubes, buckytubes, fullerene tubes, tubular fullerenes, graphite fibrils or vapor grown carbon fibers, and combinations thereof. Such carbon nanotubes can be made by any known technique including, but not limited to, arc discharge [Ebbesen, *Annu. Rev. Mater Sci.* 1994, 24, 235-264], laser oven [Thess et al., *Science* 1996, 273, 483-487], flame synthesis [Vander Wal et al., *Chem. Phys. Lett.* 2001, 349, 178-184], chemical vapor deposition [U.S. Pat. No. 5,374,415], wherein a supported [Hafner et al., *Chem. Phys. Lett.* 1998, 296, 195-202] or an unsupported [Cheng et al., *Chem. Phys. Lett.* 1998, 289, 602-610; Nikolaev et al., *Chem. Phys. Lett.* 1999, 313, 91-97] metal catalyst may also be used, and combinations thereof. In some embodiments, the CNTs are separated based on a property selected from the group consisting of chirality, electrical conductivity, thermal conductivity, diameter, length, number of walls, and combinations thereof. See O'Connell et al., *Science* 2002, 297, 593-596; Bachilo et al., *Science* 2002, 298, 2361-2366; Strano et al., *Science* 2003, 301, 1519-1522. In some embodiments, the CNTs have been purified. Exemplary purification techniques include, but are not limited to, those by Chiang et al. [Chiang et al., *J. Phys. Chem, B* 2001, 105, 1157-1161; Chiang et al., *J. Phys. Chem. B* 2001, 105, 8297-8301]. In some embodiments, the CNTs have been cut by a cutting process. See Liu et al., *Science* 1998, 280, 1253-1256; Gu et al., *Nano Lett.* 2002, 2(9), 1009-1013. In some embodiments, the CNTs are crosslinked with each other (e.g., by shear pressure). The terms "CNT" and "nanotube" are used synonymously herein.

Epoxies, according to the present invention, are crosslinked polymeric species, wherein crosslinking occurs between epoxy resin species comprising epoxide groups and curing agents composing amino groups. The process of crosslinking is termed "curing." The epoxy systems (resin+curing agent) can be any system or combination of systems that suitably allow for the covalent integration of CNTs in accordance with the methods of the present invention. Suitable epoxy resins include, but are not limited to, diglycidyl ether of bisphenol A (DGEBA), Novlac epoxy, cycloaliphatic epoxy, brominated epoxy, and combinations thereof. Suitable diamine or polyamine curing agents include, but are not limited to, cycloaliphatic amines such as bis-paraminocyclohexyl methane (PACM), aliphatic amines such as triethylenetetramine (TETA) and diethylenetriamine (DETA), aromatic amines such as diethyltoluenediamine and combinations thereof. Additionally, such epoxy systems may further comprise additives such as, but not limited to, plasticizers, antidegradation agents, diluents, toughening agents, pigments, clay fillers, and combinations-thereof.

Figure 2:
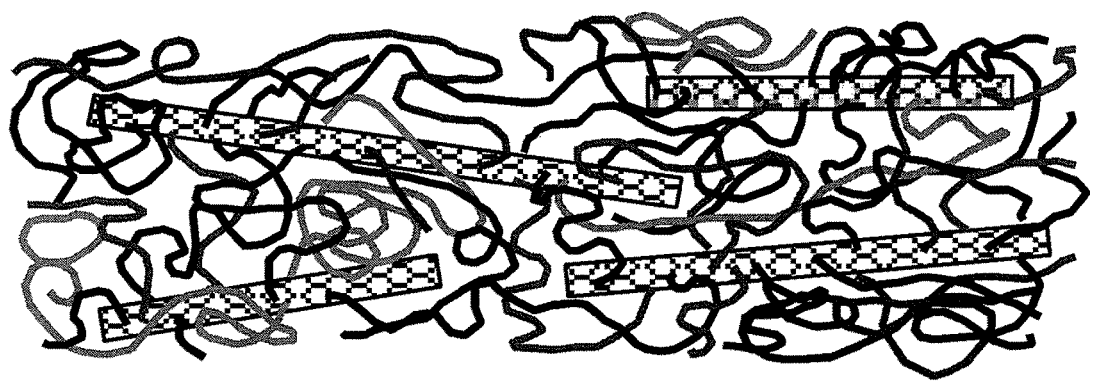
FIG. 2 illustrates the integration of the carbon nanotubes into a polymer crosslinked structure in accordance with methods of the present invention.

"Integration," as defined herein, refers to the covalent (i.e., resulting in chemical bonds) incorporation of functionalized CNTs into an epoxy matrix during the curing process (in situ) such that the CNTs are effectively copolymerized with the epoxy resin to yield fully integrated nanotube-epoxy polymer composite systems with direct chemical bonding between the matrix and the functionalized CNTs. Thus, the nanotubes become chemically bonded to the matrix and turn into integral part of the composite, as shown in FIG. 2. The scope of the present invention however is not limited to use of functionalized nanotubes, but extends to incorporation of unfuctionalized nanotubes by any of the methods or steps disclosed herein.

Depending on the embodiment, the general step of dispersing the functionalized CNTs in a solvent may require selection of a solvent suitable for dispersing functionalized CNTs with a particular group. Such dispersing may further require mixing or agitation and/or ultrasonic assistance. Such dispersing should typically result in an increased debundling of the CNTs and an increased presence of individual CNTs relative to what would ordinarily be obtained with pristine CNTs.

In the general step of adding the epoxy resin to the dispersion to form a mixture, the level of homogeneity of the resulting mixture is variable, or it can be varied in subsequent of additional processing steps.

Depending on the embodiment, the general step of removing the solvent from the mixture to form a largely solvent-free mixture generally involves an evaporative process. This evaporative process can be enhanced by heat, vacuum, or flow of inert gas.

In some embodiments, the curing agent is added to the solvent-free mixture with mixing. In some embodiments, this mixing is high shear mixing. Although partial curing may occur prior to the addition of curing agent if the functionalized CNTs comprise amine (amino) functionalities, curing generally begins subsequent to the addition of one or more curing agents, and may further involve environmental conditions such as heat, pressure, etc.

In some embodiments of the present invention, carbon nanotubes are fluorinated to yield sidewall-functionalized fluorinated carbon nanotubes in accordance with existing protocols. See commonly-assigned U.S. Pat. No. 6,645,455. In some embodiments, these carbon nanotubes are first oxidized to yield carboxylic acid groups on their ends, which are subsequently uncapped. Upon fluorinating the sidewall of the carbon nanotubes, these carboxylic acid groups remain attached to the carbon nanotube ends yielding a heterogeneously-functionalized carbon nanotube species. See Zhu, J.; Kim, J.-D.; Peng, H.; Margrave, J. L.; Khabashesku, V. N.; and Barrera, E. V. *Nano Lett.* 2003, 3(8), 1107-1113. In some embodiments, these fluorinated carbon nanotubes, which have increased dispersability in solvents like N,N-dimethylformamide (DMF), tetrahydrofuran (THF), and alcohols, are dispersed directly with the epoxy precursors (e.g., diglycidyl ether of bisphenol A (DGEBA)) and curing agents (e.g., diamines). Curing agents that are primary and secondary amines, and diamines thereof, will react with the fluorines on the CNT sidewall and form C—N bonds to the nanotube sidewall, eliminating HF in the process. When such curing agents are diamines, these diamines can react with the fluorine on the nanotube sidewall to yield CNTs with amine groups dangling from the sidewalls. These dangling amine groups can then react directly with the epoxide rings on the epoxy precursors, providing covalent integration with the epoxy as it forms. When the fluorinated CNTs also have carboxylic acid groups on their ends, these species can react directly with the epoxide rings to form esters. Alternatively, the fluorinated CNTs can be reacted with a curing agent, or any other suitable amine, prior to addition of the epoxy precursor(s). Note that the functionalized CNTs serve as an intermediate step of the process, and that other intermediate steps could be used.

In some embodiments of the present invention, organic acyl peroxides of dicarboxylic acids, such as HO(O)C—$(CH_2)_n$—C(O)O—O—(O)C—$(CH_2)_n$—C(O)OH (where if n=2 it is succinic acid peroxide, and if n=3 it is glutaric acid peroxide), are heated with carbon nanotubes to form free radicals of the type HO(O)C—$(CH_2)_n$. which then add to the nanotube sidewall. See commonly-assigned copending U.S. patent application Ser. No. 10/714,014. Reacting these sidewall carboxylic acid functionalities with a chlorinating agent like thionyl chloride ($SOCl_2$) yields acyl chloride functionalities (—$(CH_2)_n$—C(O)Cl) on the nanotube sidewall. These acyl chlorides can then react directly with the epoxy curing agents, or they can be first reacted with a suitable amine (e.g., a diamine) and then reacted with the epoxy precursor.

In still other embodiments, hydroxyl terminated functional groups are attached to the sidewalls of CNTs. This is accomplished by reacting sidewall fluorinated CNTs with metal salts such as $MO(CH_2)_n CH(R)OH$, where M=Li, Na, or K, wherein the metal salt forms upon addition of MOH to dialcohol $HO(CH_2)_n CH(R)OH$. See Zhang, L.; Kiny, V. U.; Peng, H.; Zhu, J.; Lobo, R. F. M.; Margrave, J. L.; and Khabashesku, V. N. *Chem. Mater.* 2004, 16, 2055-2061. In some embodiments, the dialcohol is bisphenol-A. Additionally or alternatively, in some embodiments, sidewall fluorinated CNTs are reacted with hydroxylated amines such as $HN(R)(CH_2)_n OH$. Once hydroxyl-terminated moieties have been appended to the CNTs, epichlorohydrin can be reacted with these hydroxyl-functionalized CNTs to impart them with epoxide groups-essentially transforming the functionalized CNTs into epoxy precursors or resins. These epoxide groups, when the functionalized CNT is dispersed with epoxy precursor, can then react with curing agents just like the epoxy precursor-providing integration of the CNTs into the epoxy matrix.

The methods of the present invention lead to functionalized nanotube-epoxy polymer composites possessing enhanced mechanical, thermal, and/or electrical properties relative to the native epoxy and nanotube-epoxy composites comprising pristine (unfunctionalized) nanotubes. In some embodiments, the nanotube-epoxy polymer composite further comprising additional additives. Such additional additives include, but are not limited to, inhibitors, curing agents, viscosity modifiers, anti-degradation species, colorants, nanoparticles, nanoclays, various types of fibers and other reinforcements seen in traditional composites, and combinations thereof.

Mechanical property enhancements observed in the nanotube-epoxy polymer composites of the present invention include an increase in Young's modulus, an increase in the tensile strength, an enhanced elongation-to-break, and enhanced load transfer to the CNTs in the composite. The functionalized nanotube-epoxy polymer composites produced by methods of the present invention will find use in applications already employing epoxies, but because of their enhanced impact strength, fatigue resistance, environmental properties, mechanical, thermal, and/or electrical properties, many other applications will likely benefit from using them.

In some embodiments, the methods of the present invention are integrated with fiber-reinforced polymeric (FRP) composites. FRP composite manufacturing methods typically involve placing a fiber reinforcement into a mold and then impregnating the fiber with uncured polymer so that the material can be shaped into the final part after curing. To fabricate nanotube/fiber reinforced polymer composites, dry reinforcement fiber is overcoated first with nanotubes, and then fabricating composites with standard lay up and resin infusion processing. This method avoids significant viscosity increase if directly mixing nanotubes into the resin, and therefore, facilitates the widely-used industrial resin infusion processing for FRP composites manufacturing. Applicants have fabricated nanotube (e.g., SWNT) enhanced FRP composites with woven fiberglass using vacuum assisted resin transfer molding (VARTM), compression molding, and vacuum bagging processing. This procedure is also suitable for most other molding methods for FRP composites such as wet lay up, spray molding, prepreg, autoclave, conventional resin transfer molding (RTM) and its derivative processing such as Seeman's composite resin injection molding process (SCRIMP), double-chamber vacuum resin transfer molding (DCVRTM), structural reaction injection molding (SRIM) etc.

Using such above-described FRP techniques, Applicants have processed nanotube/glass fiber composites with epoxy, vinyl ester, and Bismaleimide resin systems. This nanotube overcoating method can be also extended to any other low viscosity thermosetting resin systems (e.g., polyester). Suitable reinforcements include, but are not limited to, discontinuous or chopped fibers, clays, fiberglass fabric, carbon fiber, graphite fabric, KEVLAR fabric, and combinations thereof. Reinforcements can be in the form of woven fabrics or non-woven fabrics (e.g., mats).

In some of the above embodiments involving FRP, a spray-up process is used to spray-deposit a mixture of nanotubes (dispersed in one or more solvents) onto the surface of a woven fabric or mat, and later in a mode to facilitate the molding methods for FRP composite manufacturing. After the evaporation of solvent(s), nanotubes remain overcoated on the fiber weave surface in a uniform distribution or according to prescribed placement. Combining into consolidated composites, nanotubes serve as secondary reinforcement to enhance properties of laminated composites structures, such as toughness, interlaminar shear strength, compression strength, etc.

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

EXAMPLE 1

This Example serves to illustrate how fluorinated CNTs can be directly integrated into epoxy matrices.

Direct fluorination of SWNTs and their subsequent derivatization provide a versatile tool for preparation and manipulation of nanotubes with variable side-wall functionalities [Khabashesku et al., *Acc. Chem. Res.*, 2002, 35 (12), 1087]. Fluorinated single-wall carbon nanotubes (F-SWNTs) are appreciably soluble in DMF, THF, and alcohol solvents with a solubility of about 1 mg/ml in 2-propanol [Mickelson, E. T.; Chiang, I. W.; Zimmerman, J. L.; Boul, P. J.; Lozano, J.; Liu, J.; Smalley, R. E.; Hauge, R. H.; Margrave, J. L. *J. Phys. Chem. B* 1999, 103, 4318]. The fluorination of carbon nanotubes also dramatically enhances their chemical reactivity and solubility while still maintaining their superior mechanical properties. Recent studies have shown that fluorine in F-SWNTs can be efficiently displaced by the N-alkylamino functionalities. See Stevens, J. L.; Huang, A. Y.; Chiang, I. W.; Khabashesku, V. N.; Margrave, J. L. *Nano Lett.* 2003, 3, 331. This offers an opportunity for SWNTs to be integrated into the structure of the epoxy system through such sidewall-attached amino functional groups.

The present Example is focused on chemical modification of single wall carbon nanotubes (SWNTs) in an attempt to achieve high dispersion and enhanced interaction (integration) in an epoxy matrix for the preparation of nanotube-reinforced composites with improved mechanical properties. Functionalization of SWNTs was carried out using two main chemical routes: open-end oxidation and sidewall fluorination.

Materials

Purified SWNTs (BuckyPearls) were provided by Carbon Nanotechnologies, Inc. (Houston, Tex.). SWNTs were produced by a high pressure HiPco process [Bronikowski, M. J.; Willis, P. A.; Colbert, D. C.; Smith, K. A.; and Smalley, R. E. *J. Vac. Sci. Technol. A* 2001, 19, 1800-1805] and fabricated into millimeter-sized BuckyPearl pellets. BuckyPearls are described in commonly-assigned copending U.S. patent application Ser. No. 10/391,988, filed Mar. 19, 2003. This commercial material contains ~13 wt % Fe catalyst. The epoxy resin was a DGEBA epoxy (Diglycidyl ether of bisphenol A)-EPON 862 obtained from Shell Chemicals. This resin was used in combination with the commercial aromatic diamine EPI-CURE W curing agent. The typical molecular structure of DGEBA is shown below:

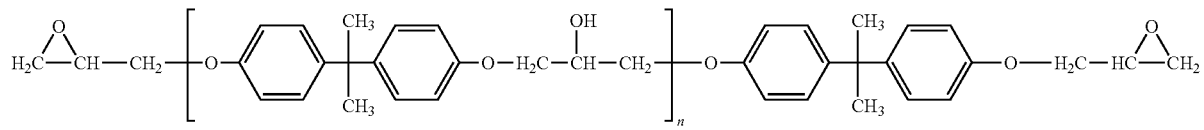

Anhydrous dimethylformamide (DMF), used as a solvent in the present Example, was purchased from Fisher Scientific. An air release agent, BYK-555, was obtained from Chemie.

Acid Treatment of SWNTs

For the preparation of end-functionalized SWNTs, an oxidizing acid treatment was used (Scheme 1), being modified in the present Example from that developed earlier by Liu et al. [Liu et al., Science 1998, 280, 1253]. In a typical treatment, 500 mg of SWNTs were immersed in 250 ml of concentrated $H_2SO_4$/70% $HNO_3$ (3:1) mixture. Through a series of trials with different treatment times, it was determined that one hour of sonication at room temperature (compared with 24 hours for laser ablation produced SWNTs) was optimal for end cap oxidation of HiPco-produced SWNTs. Short-term acid treatment is generally preferred for SWNTs in order to maintain their full-length with minimal surface defect introduction. In a final step, HCl was added to the acid mixture to facilitate the termination of opened ends of the SWNTs with carboxylic acid groups rather than carboxylate. See Chen, J.; Hamon, M. A.; Hu, H.; Chen, Y.; Rao, A. M.; Eklund, P. C.; Haddon, R. C. Science, 1998, 282, 95. The solution was washed extensively with water and NaOH solution. Still referring to Scheme 1, the acid treated nanotubes 2 (denoted as SWNT-COOH) were collected on a 0.25 μm Millipore membrane by filtration and dried in a vacuum oven at 70° C.

Fluorination of SWNT-COOH.

Acid treated nanotubes were fluorinated in a manner similar to the procedure developed by Mickelson et al. [Mickelson, E. T.; Huffman, C. B.; Rinzler, A. G.; Smalley, R. E.; Hauge, R. H.; Margrave, J. L. Chem. Phys. Lett. 1998, 296, 188], but with the addition of a small amount of $H_2$ (to promote the formation of catalytic HF) to the reaction chamber. The fluorination was carried out in a Monel reactor heated at 150° C. for 12 hours, using such conditions required for obtaining an approximately $C_2F$ stoichiometry. The gas flow ratio for fluorine, hydrogen and helium was 2:1:30. The fluorinated acid treated nanotubes 3 (Scheme 1) are denoted F-SWNT-COOH.

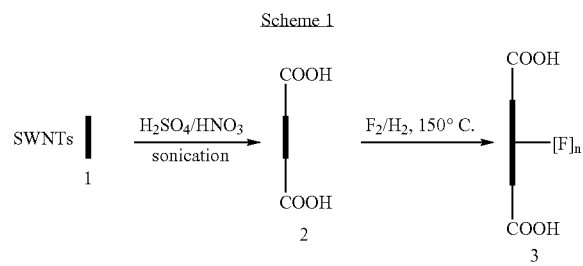

Scheme 1

Dispersion and Composite Preparation

The functionalized nanotubes were dispersed in DMF (2 mg/mL) with sonication for 5 min using a high power cup-horn ultrasonic processor, and then for 20 min in an ultrasonicator bath (40 KHz). Thereafter, the epoxy resin was added and the solution was stirred for 30 min. The DMF was evaporated at 100° C. in a vacuum chamber. The SWNT/epoxy blend was prepared by stirring for 5 min with a high shear mixing homogenizer to ensure good homogeneity. A 100/26 ratio of EPI-CURE W curing agent was then added and further stirring performed with the high shear mixer. The blend was degassed for 5 hours in a vacuum oven and then cast into an aluminum mold. The curing cycle was two hours at 100° C. under a pressure of 0.3 MPa, followed by another two hours at 160° C. During mixing, an air release agent, BYK-A 555, was added to help reduce porosity.

All nanotube/epoxy composites were prepared using a 1 wt % load for both pristine BuckyPearl SWNTs and functionalized SWNTs. Five dog-bone shape specimens were cut and polished for tensile testing. Following the same procedure described above, a control sample from pure epoxy resin was also prepared and tested for comparison.

Characterization

Attenuated total reflectance-Fourier transform infrared (ATR-FTIR) spectroscopy and Raman spectroscopy, as well as SEM/EDAX analysis, were used to characterize the functionalized SWNTs. Inspection of the nanotube dispersion in solvents and epoxy resins was carried out using a ZEISS optical microscope (resolution up to a micrometer). The distribution of nanotubes in the epoxy matrix was visually observed and photographed using a digital camera at a low magnification of 50×. The size of nanotube aggregates dispersed in the solvent was measured with a MALVERN instrument-Zetasizer 3000 system. This instrument uses a dynamic light scattering method and can measure particle dispersion size ranging from 2 nm to 3 μm. The morphology of the nanotube/epoxy composites was investigated using a Philips scanning electron microscope (SEM) operating at an accelerating voltage of 30 kV. Fracture surfaces of nanotube epoxy specimens were sputter-coated with gold prior to their observation. Tensile testing was performed using a screw-driven INSTRON testing machine according to the ASTM standard D638.

Functionalized SWNTs, Solubility, and Dispersion

Figure 3:
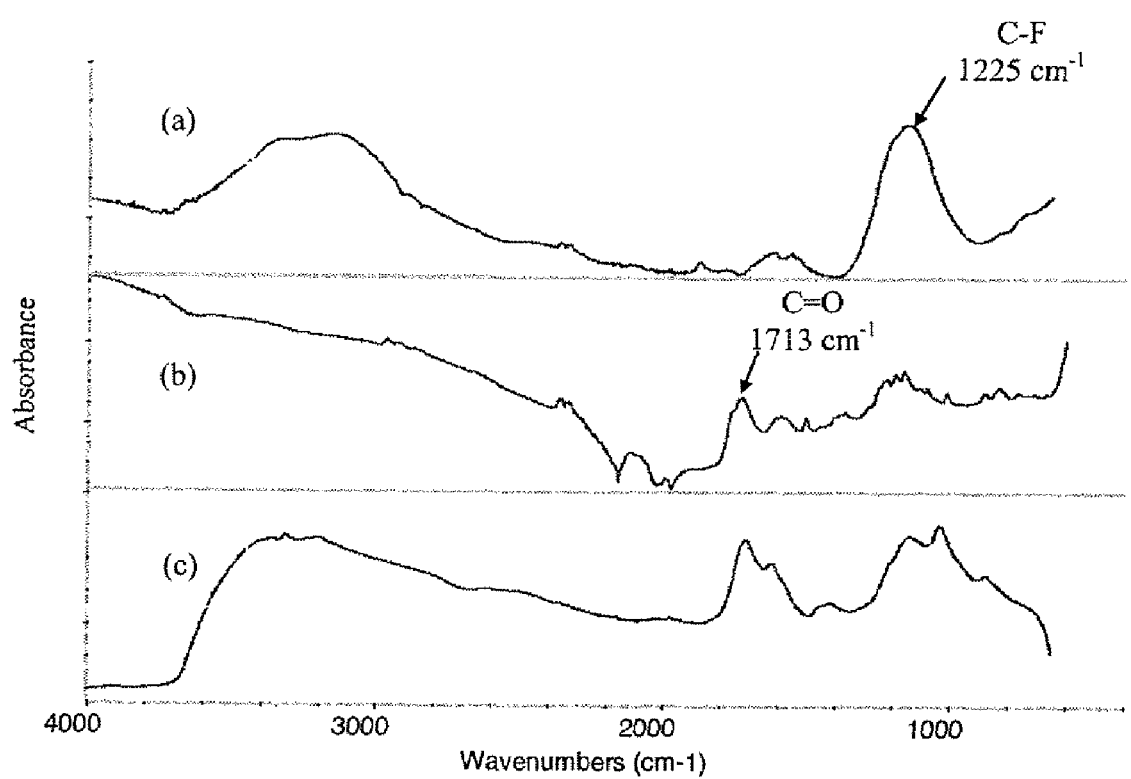
FIG. 3 depicts ATR-IR spectra of functionalized nanotubes, the various traces corresponding to the following products: (a) F-SWNT, (b) SWNT-COOH, and (c) F-SWNT-COOH.
Figure 4:
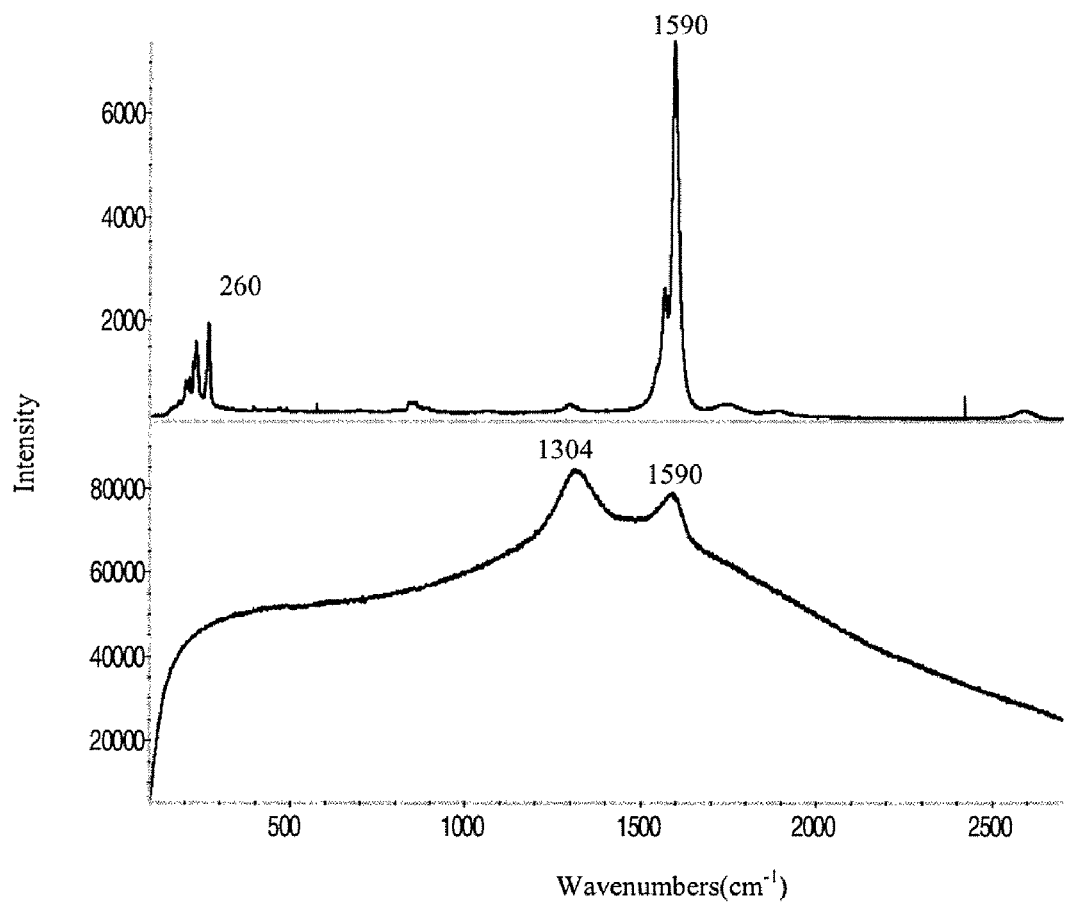
FIG. 4 depicts Raman spectra of (a) pristine and (b) functionalized SWNTs.

The efficiency of functionalization through the acid treatment and subsequent fluorination was confirmed by ATR-FTIR and Raman spectroscopies, as shown in FIGS. 3 and 4. The presence of characteristic bands of the C=O, O—H, and C—O bonds, due to the formation of COOH groups predominantly on the open end-tips of the nanotubes after acid treatment, is evident in the IR spectrum shown on FIG. 3b. The broad band of the C—F stretch appears in the 1220-1250 $cm^{-1}$ region after fluorination of the pristine SWNT (FIG. 3a). The carboxylic groups remain intact after fluorination of the acid treated SWNTs (SWNT-COOH), as confirmed by the spectrum shown on FIG. 3c. The Raman spectrum of pristine SWNTs shows typical breathing modes at 200–260 $cm^{-1}$ and tangential modes at 1590 $cm^{-1}$ (FIG. 4a). The appearance of the $sp^3$ carbon peak at 1301 $cm^{-1}$ after acid treatment and subsequent fluorination (FIG. 4b) indicates that the sidewalls of the nanotubes in the F-SWNT-COOH derivative are covalently modified by the attached fluorine. Energy dispersive analysis of X-rays (via SEM/EDAX) elemental analysis of these SWNT-derivatives yielded an oxygen content of 16 wt % and a fluorine content of 20 wt %, confirming the attachment of fluorine and carboxylic groups to the nanotube framework.

The combination of acid treatment and subsequent fluorination of SWNTs was used in the present work for increasing their solubility in the solvent and facilitating a uniform dispersion in the epoxy resin. It is known that acid oxidation treatment not only results in shortened nanotubes with carboxyl acid groups mainly on the end tips but also leads to a smaller diameter nanotube bundles [Liu, Science 1998, 280, 1253; Yao, N.; Lordi, V.; Ma, S. X. C.; Dujardin, E.; Krishnan, A.; Treacy, M. M. J.; Ebbesen, T. W. *J. Mater. Res.* 1998, 13, 2432]. Fluorination further improves the solubility due to the interaction of the solvent and fluorine atoms on the surface of nanotubes [Khabashesku et al., *Acc. Chem. Res.*, 2002, 35 (12), 1087; Mickelson et al., *J. Phys. Chem. B* 1999, 103, 4318].

Figure 5:
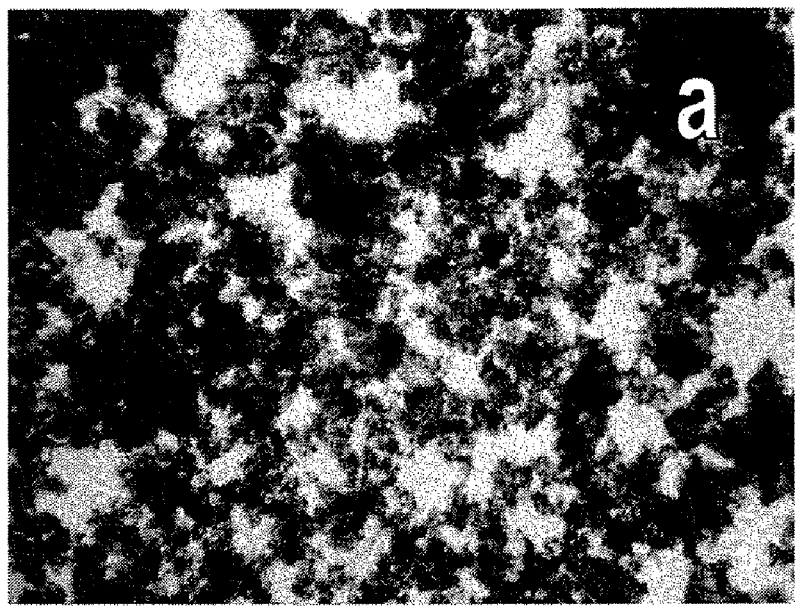
FIG. 5 depicts optical micrographs of carbon nanotube dispersions (2 mg/mL in DMF), wherein micrograph (a) is of pristine BuckyPearl SWNTs, and micrograph (b) displaying high dispersion, is of F-SWNT-COOH.
Figure 5:
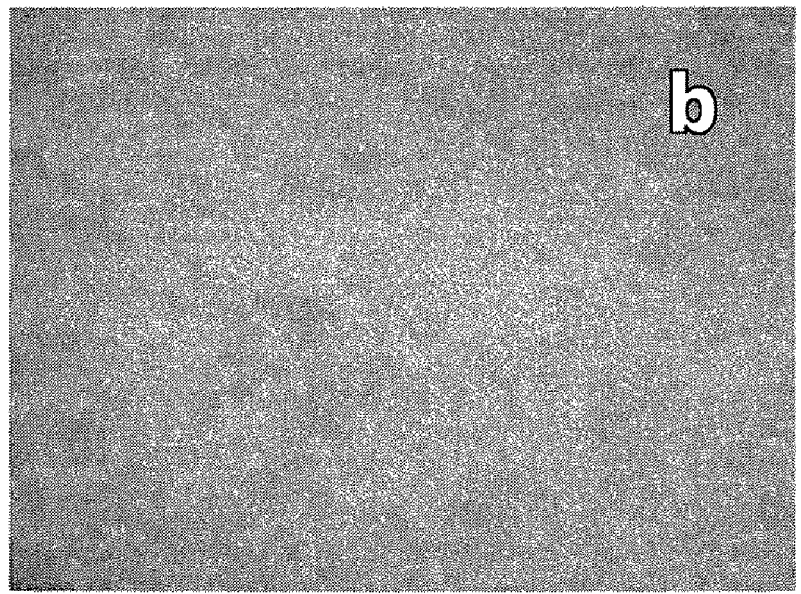

Applicants have shown that the above-described functionalized nanotubes can be easily dissolved in DMF within a few minutes by high power sonication. Optical micrographs, taken to compare the dispersion of both functionalized and pristine BuckyPearl (unfunctionalized) nanotubes in DMF, are shown on FIGS. 5 *a* and *b*. The 2 mg/mL dispersion of F-SWNT-COOH in DMF is visually non-scattering and homogeneously stable. No precipitation occurred over four weeks of standing. The average aggregate size of pristine BuckyPearl nanotubes in DMF (FIG. 5*a*), was measured to be 3 μm by the above-mentioned scattering method, was significantly reduced to average size of 300 nm for the functionalized nanotubes (FIG. 5*b*). Since HiPco SWNTs have smaller average diameters (~1 nm for the (8,8) nanotubes) and are more reactive due to a higher curvature, they are believed to be oxidized more rapidly than the larger diameter SWNTs produced by laser ablation [Rao, A. M.; Chen; J.; Richter, E.; Schlecht, U.; Eklund, P. C.; Haddon, R. C.; Venkateswaran, U. D.; Kwon, Y. K. Tomanket, D. *Phys. Rev. Lett.* 2001, 86]. For this reason, much shorter acid treatment time should be applied to BuckyPearl nanotubes in order to maintain their length and prevent the introduction of defects in to the sidewalls. A series of treatment times ranging from 30 min to 4 hours were evaluated and the solubility of oxidized SWNTs compared. It was found that one hour sonication treatment is optimal for achieving good solubility of SWNT-COOH in DMF. Functionalized SWNTs also show considerable improvement in dispersion throughout the epoxy matrix in comparison with the purified BuckyPearl SWNTs. Only a very few large agglomerates were visible by optical microscopy in the dispersions of the former, while many aggregated clusters were observed for the latter. Applicants have also found that special care must be taken to prevent nanotube re-aggregation when the solvent is being evaporated and the concentration of nanotubes becomes high. Thus, it is evident from the foregoing that such functionalization significantly enhances dispersion of the CNTs.

Interaction between Nanotubes and Epoxy Matrix

Carboxyl and fluorine groups covalently attached to CNTs offer the opportunity for chemical interactions with the epoxy systems. Composite fabrication processes can therefore take advantage of the presence of those functional groups. It is known that the epoxy groups can directly react with the carboxylic acid functionalities to form esters [May, C. A. *Epoxy Resins: Chemistry and Technology*, Marcel Dekker, Inc. 1988]. In the presence of tertiary amines the epoxy groups are also capable of reacting with the hydroxyl function to form an ether linkage. It was recently demonstrated that fluorine on the sidewalls of fluoronanotube can be readily displaced by alkylidene amino groups at moderate temperature [Stevens et al., *Nano Lett.* 2003, 3, 331]. This data suggested that the fluoronanotubes may also react in situ with the amine curing agents during a high temperature curing process of the epoxy systems. This means that the incorporation of the fluorinated nanotubes into the epoxy/amine reaction will produce efficient interfacial bonding. An esterification reaction of the carboxylic acid functional groups on the nanotubes with the epoxy rings is shown on Scheme 2, where "X" in 5 represents the bisphenylmethylene spacing unit in the epoxy structure. Multiple epoxy functional groups can provide crosslinked coupling of the nanotubes to the epoxy matrix. The in situ reaction of fluoronanotubes with a diamine during the high temperature curing process is shown on Scheme 3, where "Y" in 8 represents the hydrocarbon spacing units in the diamines. While only one functional group is shown in products 6 and 9, it should be understood that numerous such functional groups are attached at the ends and/or along the sidewalls of the nanotubes.

Scheme 2

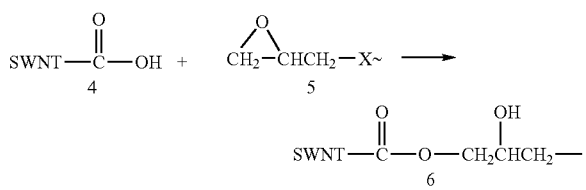

Scheme 3

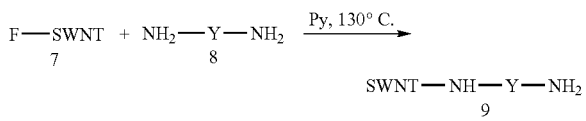

Figure 6:
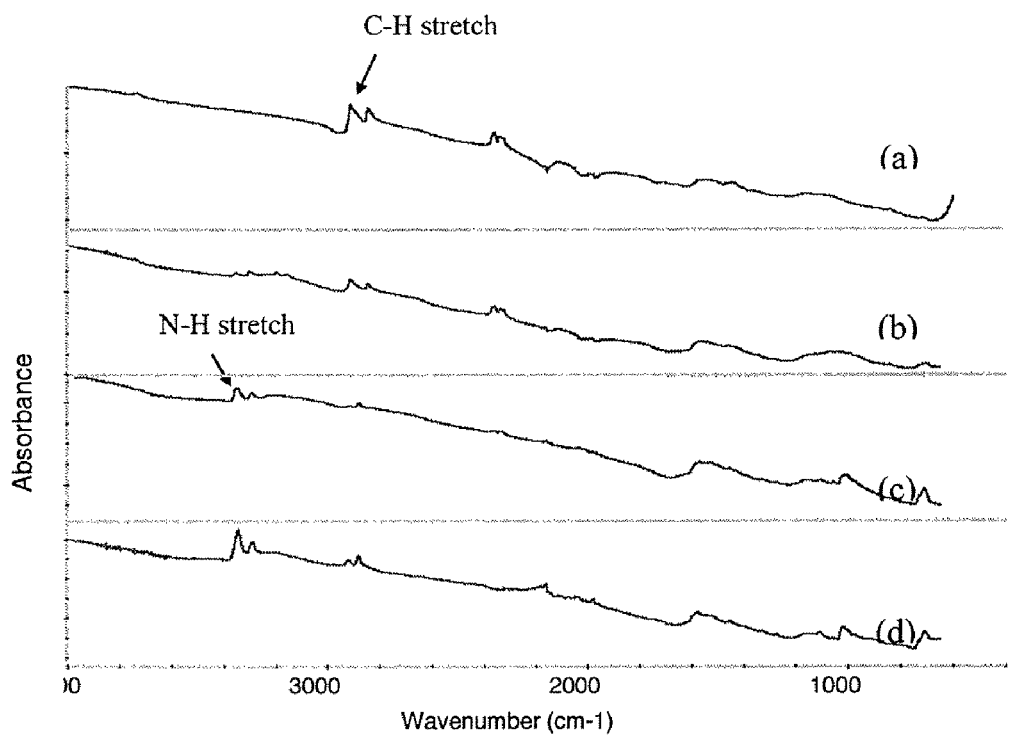
FIG. 6 depicts ATR-IR spectra of SWNT derivatives produced by reactions with several diamines: (a>cycloaliphatic diamines, (b) aromatic diamines, (c) long-chain aliphatic diamines (TETA), and (d) aliphatic diamines (EDA)
Figure 7:
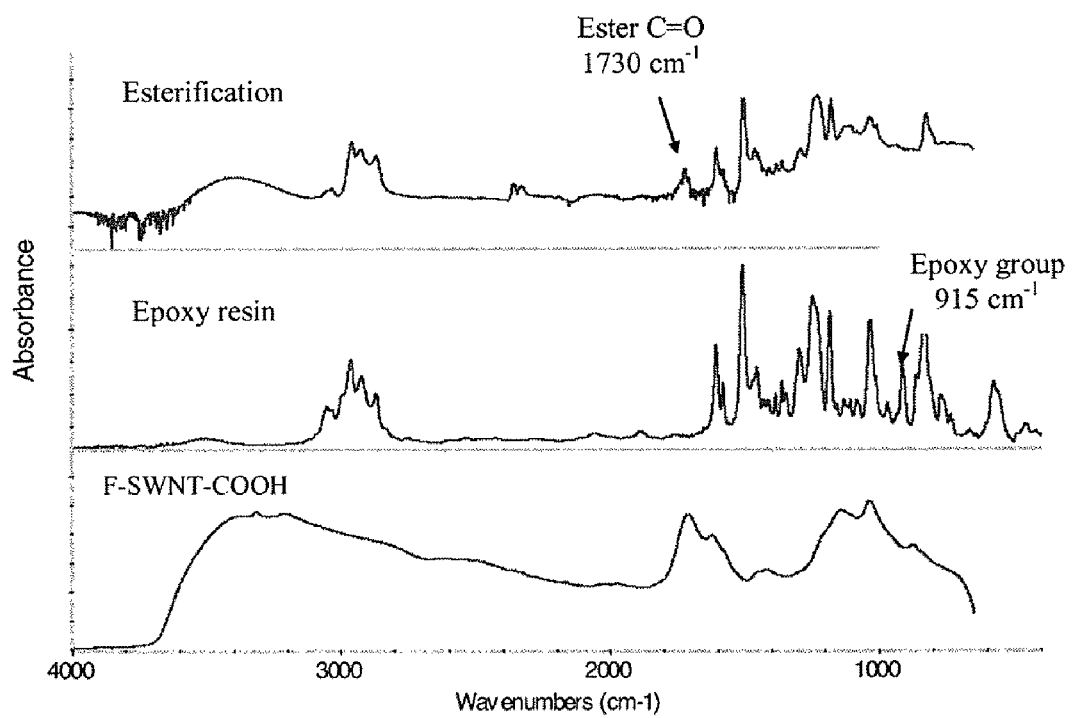
FIG. 7 depicts ATR-IR spectra of the F-SWNT-COOH functionalized nanotubes (bottom), the epoxy resin (middle), and the product of the esterification reaction between the functionalized nanotubes and the epoxy resin (top)

ATR-IR spectroscopy was used to verify the occurrence of the reactions shown on Schemes 2 and 3. For the reaction with amines, fluoronanotubes were initially dispersed in a variety of commercial diamines, such as aliphatic diamines, triethylene tetraamine (TETA) and diethylene triamine (EDA), cycloaliphatic diamines, PACM, and aromatic diamines, EPI-CURE W, and then heated at 130° C. for two hours, by the method of an earlier work [Stevens et al., *Nano Lett.* 2003, 3, 331]. After the reaction, corresponding diamine was completely removed by extensive washing using ethanol, and the functionalized SWNT product was subsequently dried overnight. ATR-IR spectra (FIG. 6) of the derivatized nanotubes showed the disappearance of C—F bond stretches as a result of the reaction. New peaks in the 3100-3400 and 2800-3000 cm$^{-1}$ regions, representing the N—H and C—H stretches, respectively, were observed. These new peaks indicated the displacement of fluorine by the diamino functionality. However, the band intensity of the N—H stretches was quite weak, especially for the long-chain amines, likely because of crosslinking and a tighter bundling of the derivatized nanotubes. For example, in case of the product of F-SWNTs and cycloaliphatic diamine (FIG. 6*a*), the C—H stretching bands were observed to be strong, while the N—H modes were observed to be very weak. Nevertheless, the SEM/EDAX analysis of the diamino functionalized nanotubes yielded significant nitrogen content (15-20 wt %). The infrared (IR) spectrum of the epoxy sample containing the functionalized nanotubes after heating for two hours at 160° C. shows an intense band at 1730 $cm^{-1}$, characteristic of the carbonyl (C=O) stretch of the ester derivatives (FIG. 7). The epoxy group at 915 $cm^{-1}$ disappeared, likely indicative of an esterification reaction between the carboxylic acid and epoxy. These results show that the fluorine and carboxylic acid functional groups grafted on the nanotubes can provide in situ chemical integration of the nanotubes into the amine/epoxy system. This type of interaction is believed to improve the interfacial bonding between the nanotubes and the epoxy matrix, since similar chemical reaction has been demonstrated in traditional carbon fiber/matrix interface studies [Kozlowski, C.; Sherwood, P. M. A. *Carbon* 1987, 25 (6), 751; Jones, C. *Compos. Sci. Tech.* 1991, 42, 275].

Microscopic Analysis

Figure 8:
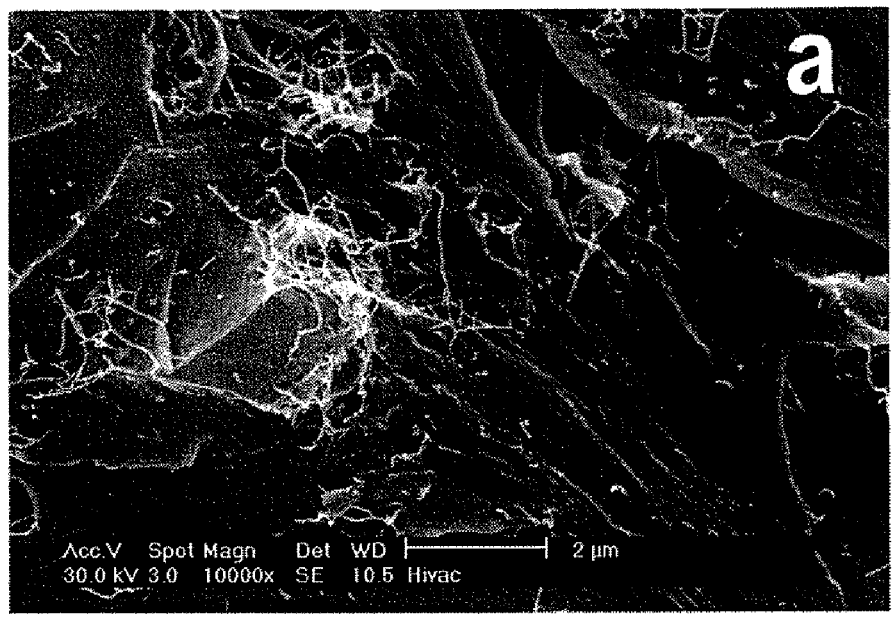
FIG. 8 depicts SEM images of fracture surfaces of 1 wt % nanotube/epoxy composites showing dispersed individual nanotube ropes, wherein image (a) is of a non-uniform dispersion of pristine BuckyPearl SWNTs in an epoxy matrix, and (b) is of an improved dispersion comprising functionalized nanotube in epoxy matrix (note that only shown are nanotube ropes as some nanotubes may not be seen if single and unwrapped)
Figure 8:
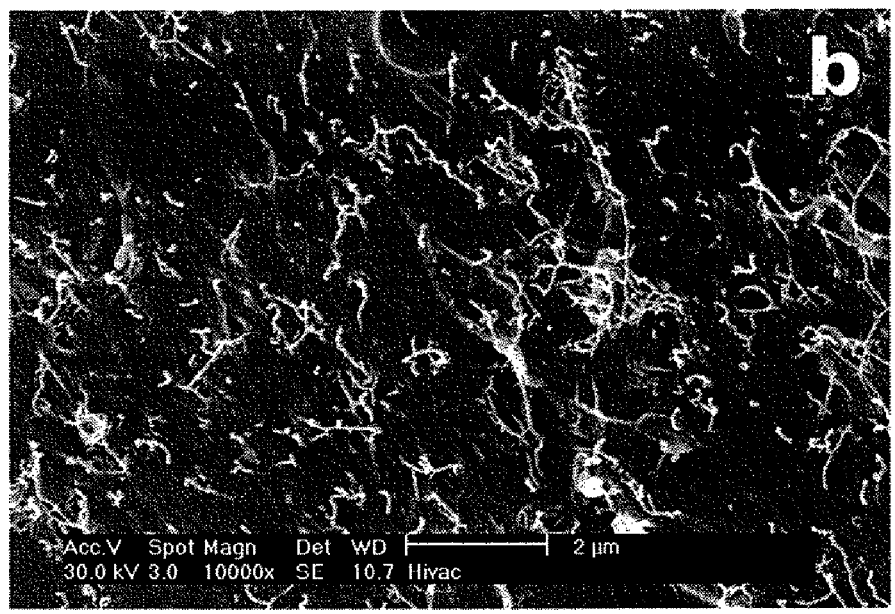

SEM images (FIGS. 8 a and b) of the composite fracture surfaces show the dispersion of the SWNTs in the epoxy matrix. Good homogeneity was achieved for the functionalized nanotubes (FIG. 8b). A number of bundles were found to break rather than just pull out at the surface, suggesting that the bonding exists between epoxy matrix and SWNTs. In comparison, fracture surfaces of the epoxy composites loaded with the untreated BuckyPearls nanotubes (FIG. 8a) show a non-uniform dispersion and the tendency for the nanotubes to entangle as agglomerates. More sliding occurred for the pristine SWNTs in the epoxy matrix, suggesting limited load transfer.

Mechanical Properties

Figure 9:
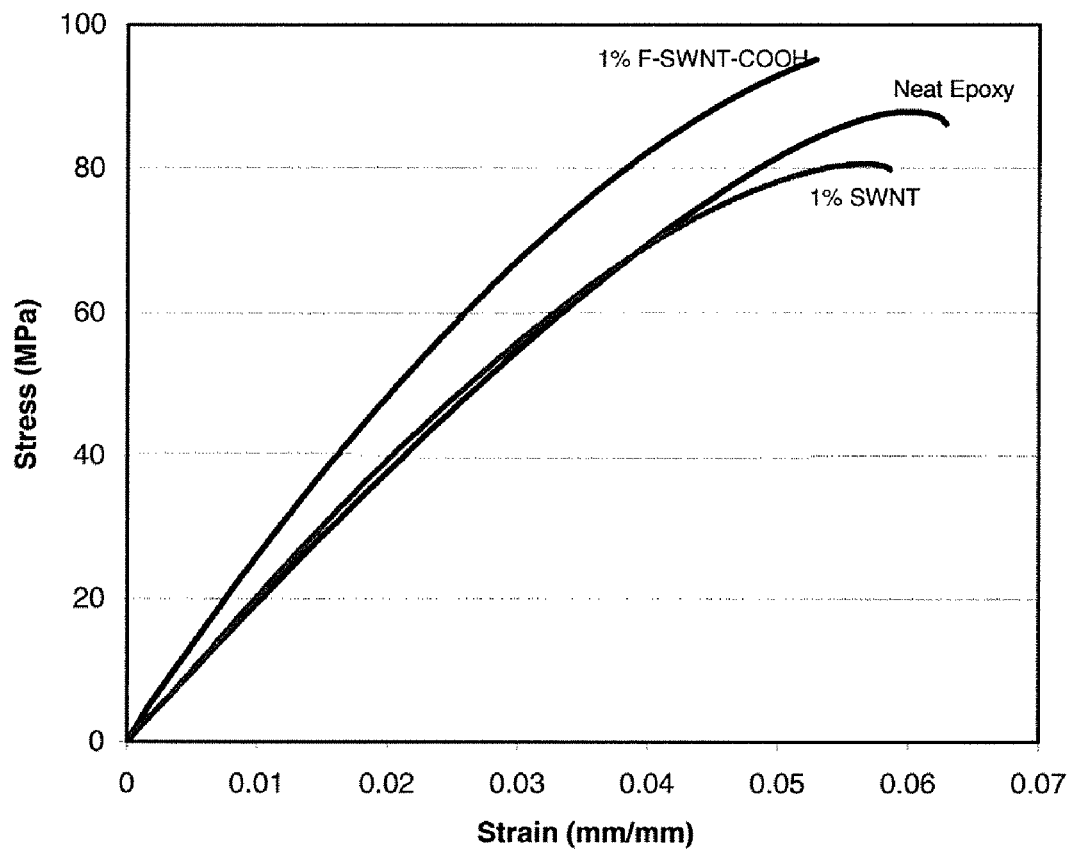
FIG. 9 illustrates tensile stress versus strain curves for nanotube/epoxy composites of the present invention.

Epoxy composites with 1 wt % CNT loading have been fabricated using a hot press molding method. Tensile testing was performed to evaluate the effect of nanotubes on the mechanical properties of an epoxy system. Compared to the neat epoxy resin, the mechanical properties showed very slight change in modulus but a decrease in tensile strength when 1 wt % untreated BuckyPearl SWNTs were used directly (Table 1). In comparison, the epoxy composites with 1 wt % functionalized nanotubes had a tensile strength of 95 MPa and a modulus of 2,632 MPa (2.6 GPa), showing an 18% and 24% improvement over the epoxy composites with BuckyPearls SWNTs, respectively. A 30% increase in modulus over the neat epoxy resin was measured. The tensile stress vs. strain curves are given on FIG. 9 for comparison. These results demonstrate that the use of functionalized SWNTs in composites could efficiently enhance reinforcement by improving solubility and dispersion, and by chemically bonding to the polymer matrix (integration). Further, homogeneous dispersion makes more nanotube surfaces available for interaction with the surrounding epoxy matrix. Carboxylic acid and fluorine functional groups on the nanotubes provide strong interactions with the epoxy system through esterification and coincident curing; as a result, more effective load transfer to the epoxy matrix is believed to result.

TABLE 1

Average tensile strength of epoxy composites

| Epoxy Composite Formulation | Young's Modulus E (MPa) | Tensile Strength σ (MPa) |
|---|---|---|
| Neat Resin 862/W | 2026 | 83.2 |
| 1% BuckyPearl SWNTs | 2123 | 79.9 |
| 1% F-SWNT-COOH | 2632 | 95.0 |

Conclusion

A practical use of chemical modification of single-walled nanotubes for enhancing the dispersion and integration of nanotubes in epoxy composite applications has been demonstrated in this Example. The combination of acid treatment and fluorination caused both end-tip and sidewall functionalization. With additional aid from ultrasonication and high shear mixing, a high degree of nanotube dispersion in the epoxy matrix can be achieved. The uniformly dispersed and functionalized nanotubes provide for efficient interaction with the epoxy matrix and thus enhance the overall mechanical properties of the resulting epoxy composites. Mechanical tests have confirmed the reinforcing effect of functionalized nanotube in epoxy composites through homogenous dispersion and the formation of robust chemical bonds to the matrix, resulting in covalent integration.

EXAMPLE 2

This Example serves to illustrate how CNTs functionalized by reaction with peroxides can be dispersed and integrated into epoxy matrices.

Materials

Like the previous Example, the work described in this Example, was performed with SWNTs produced by the HiPco process (Carbon Nanotechnologies, Inc.) and supplied in a compact BuckyPearl form consisting of micro-sized aggregates. This SWNT material contained 11 wt % impurity of Fe catalyst. The diameter of the SWNTs is estimated at 1 nm to 1.4 nm and the length ranges from about one hundred nanometers to micrometers. The measured Young's modulus is 1.4 TPa and the expected elongation to failure is 20-30% [M. F. Yu, B. S. Files, S. Arepalli, R. S. Ruoff, *Phys. Rev. Lett.* 2000, 84, 5552]. The tensile strength of individual SWNTs has been estimated to be 22.2 GPa [F. Li, H. M. Cheng, S. Bai, G. Su, *Appl. Phys. Lett.* 2000, 77, 3161]. The epoxy resin, Diglycidyl ether of bisphenol-A epoxy, EPON 862, was obtained from Shell Chemicals. Aromatic diamine EPON W was used as a curing agent for epoxy. For modification of the carboxylic acid-terminated functionality on the SWNTs, a diamine, bis (p-aminocyclohexyl) methane, which is a curing agent available commercially as AMICURE® PACM, was purchased from Air Products.

Functionalization

Figure 10:
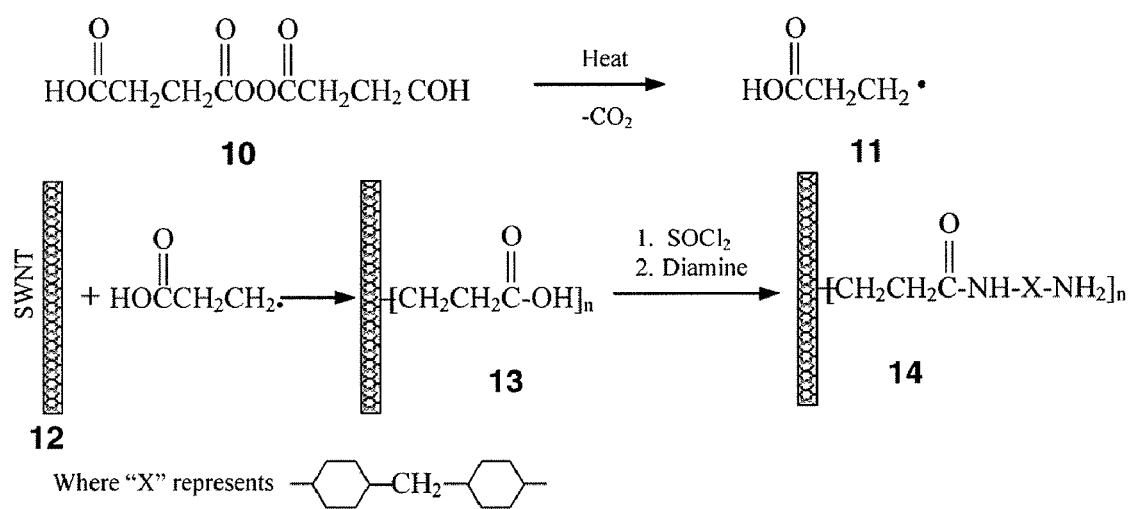
FIG. 10 depicts a reaction scheme in accordance with at least one embodiment of the present invention, wherein acid-treated SWNTs 12 are reacted with succinic acid peroxide 10 to attach ethylcarboxyl groups 11 to the SWNT sidewalls to produce functionalized SWNTs 13, and wherein such functionalized SWNTs are further reacted with a chlorinating agent and a diamine to yield functionalized SWNTs 14 having amine functionality.

Purified BuckyPearl SWNTs were sonicated for 15 min in a 3:1 mixture of concentrated $H_2SO_4/HNO_3$ using a 40 KHz bath sonicator. HCl was added to the mixture to facilitate the termination of opened ends of the SWNTs with carboxylic acid groups [J. Chen, M. A. Hamon, R. C. Haddon, *Science*, 1998, 282, 95], and thereby provide sites for further functionalization at the end tips. The product was extensively washed with water and NaOH solution. The acid treated nanotubes were collected on a 0.25 μm Millipore membrane by filtration and dried overnight in a vacuum oven at 70° C. Referring to FIG. 10, the next step involved the reaction of acid treated SWNTs 12 (—COOH groups not shown) with succinic acid peroxide 10 (and heat) to attach the ethylcarboxyl groups 11 to the SWNTs sidewalls [H. Peng, L. B. Alemany, J. L. Margrave, V. N. Khabashesku, *J. Am. Chem. Soc.* 2003, 125, 15174-15182] according to FIG. 10. During the third step, the SWNTs with attached ethylcarboxyl groups 13 were converted to acid chlorides by refluxing in thionyl chloride to facilitate subsequent reaction with the diamine. In order to prevent the excessive crosslinking of functionalized nanotubes, a large excess of diamine was used and the reaction time was adjusted to four hours. The reaction temperature was held at 70° C. in the case of bis(p-aminocyclohexyl)methane. The resulting reaction product 14 was the amino-terminated amide derivative of the SWNT, denoted as SWNT-R—NH$_2$. This type of functionalization has been achieved both on sidewalls and end tips of the SWNTs.

Nanotube Epoxy Composites Preparation

For the fabrication of nanotube-epoxy composites using SWNTs, the following procedure was developed: First, a nanotube dispersion in chloroform (2 mg/ml) was obtained by a 5 min sonication of SWNTs in CHCl$_3$ using a high power cup-horn ultrasonic processor, and then for 20 min in a lower power ultrasonic bath (40 KHz). Thereafter, the epoxy resin was added and the solution stirred for 10 min. The mixture was then placed in a warm sonicator bath and sonicated at 60° C. until most of the solvent was evaporated off. The mixture was then transferred into a vacuum chamber for complete removal of the solvent. The largely solvent-free nanotube-epoxy blend was stirred for 5 min with a high shear mixing homogenizer to ensure good homogeneity. EPI-CURE W curing agent was added and further stirring was performed manually. The blend was degassed for 2 hours in a vacuum oven and then cast into an aluminum mold. The curing cycle took one hour at 100° C. followed by two hours at 175° C. in an oven. Nanotube-epoxy composites were prepared using 1 and 4 wt % loadings of nanotubes.

Characterization and Mechanical Testing

ATR-FTIR was used to characterize the functionalized SWNTs. The morphology of the nanotube/epoxy composites was investigated using a Philips scanning electron microscope (SEM) at an accelerating voltage of 30 kV. Fracture surfaces of a nanotube epoxy specimen were sputter-coated with gold prior to their observation. Tensile testing was performed using a screw-driven INSTRON testing machine with a 5 kN load cell according to the ASTM standard D638. Five to ten specimens were tested for each sample. Dynamical mechanical analysis was performed on a Perkin-Elmer Pyris Diamond DMA instrument at a frequency of 1.0 Hz with dual-cantilever bend mode. The temperature ranged from −40° C. to 200° C. at a heating rate of 5.0° C./min.

Results and Discussion

Figure 11:
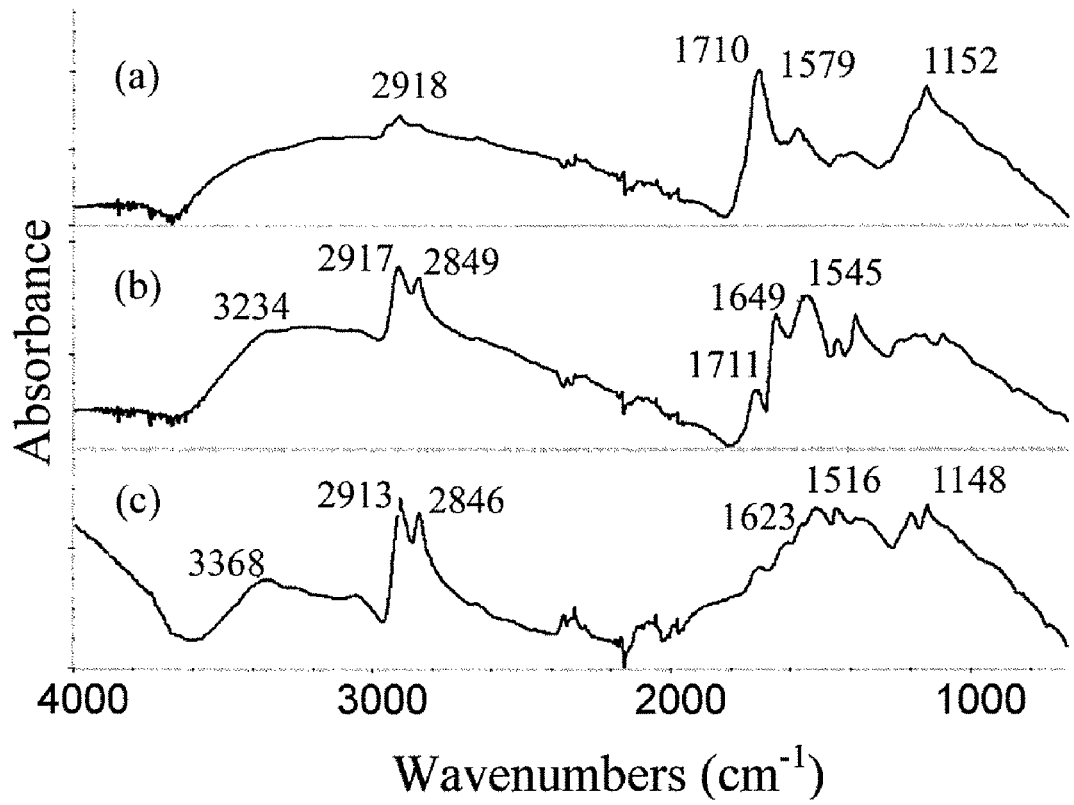
FIG. 11 depicts ATR-FTIR spectra of functionalized SWNTs, wherein trace (a) corresponds to SWNT-$CH_2CH_2COOH$ formed from peroxide treatment, trace (b) corresponds to SWNT-$CH_2CH_2CONHC_6H_{10}CH_2C_6H_{10}NH_2$, and trace (c) corresponds to SWNT-$CH_2CH_2CONHC_6H_{10}CH_2C_6H_{10}NH_2$ with acid treatment (denoted as SWNT-R—$NH_2$)

The SWNT materials were characterized by ATR-FTIR spectroscopy, which has proven to be an important technique for studies of functionalized SWNTs. The FTIR spectra obtained are shown in FIG. 11. In the spectrum of peroxide treated nanotubes (FIG. 11a), a very broad shoulder peak within 3100-3600 cm$^{-1}$ is assigned to the O—H stretches of terminal carboxyl groups, the peak at 2918 cm$^{-1}$ can be assigned to the C—H stretch, and the peaks at 1710 and 1152 cm$^{-1}$ are likely associated with the carboxylic C=O and C—O stretching vibrations, respectively. The 1419 cm$^{-1}$ peak is consistent with the C—H bending mode, and the absorption at 1579 cm$^{-1}$ is most likely from the C=C stretching mode of the nanotubes, the latter of which is likely activated by sidewall attachment. FIGS. 11b and 11c show the FTIR spectra of amino terminated amide derivatives, without and with acid treatment, respectively. The broad peaks centered at 3234 and 3368 cm$^{-1}$ can be assigned to N—H stretching vibrations. The peaks corresponding to C—H stretches in the 2800-3000 cm$^{-1}$ range appear greatly enhanced in these spectra relative to those of SWNT-CH$_2$CH$_2$COOH (FIG. 11a) because of the attachment of additional methylene groups. And, as expected, the carbonyl peaks were found to downshift to 1649 and 1623 cm$^{-1}$ due to the formation of amide linkages.

The SWNT-R—NH$_2$ species, such as 14 (FIG. 10), can be viewed as a polyamine system since it has multiple amino groups terminating each sidewall functionality as well as possibly more than one moiety bonded to an open end of the nanotube. This makes the amino-terminated functionalized nanotubes, by themselves, very effective curing agent for the epoxy resins. As a result, nanotubes can be integrated easily into the matrix structure via reaction with the epoxy and consequently become an integral part of the matrix polymer structure (Scheme 4) rather than separate filler. The new robust covalent bonds formed between the amino groups and epoxy matrix can provide strong interfacial shear stress and therefore effective load transfer.

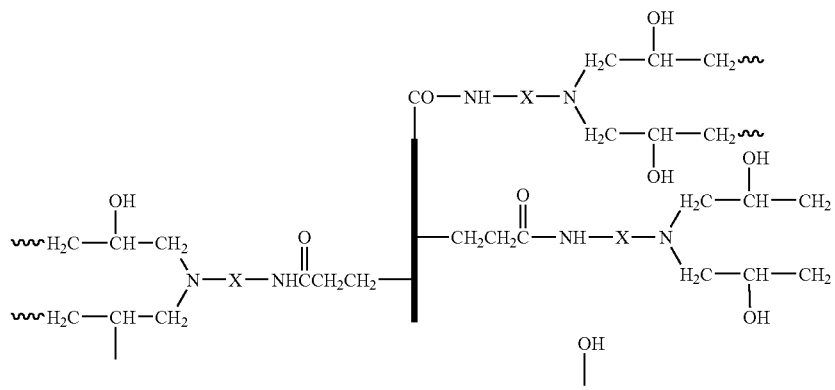

Scheme 4

Figure 12:
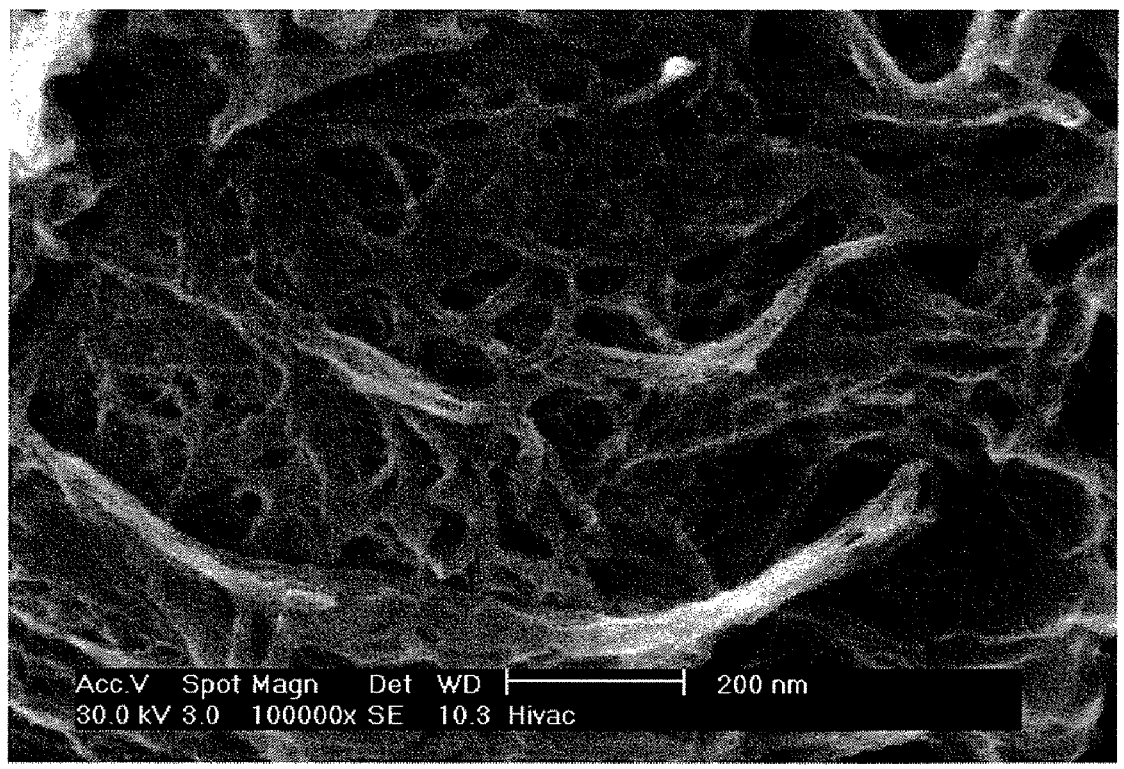
FIG. 12 depicts an SEM image of functionalized nanotubes of the type SWNT-R—$NH_2$.
Figure 13:
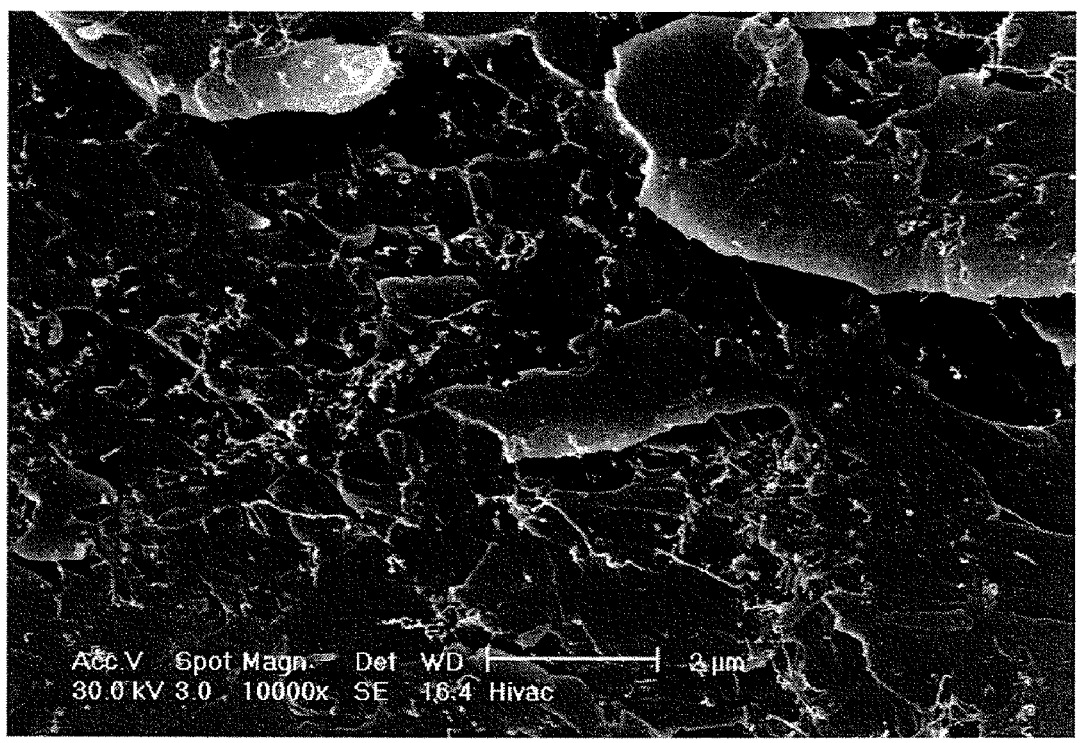
FIG. 13 depicts an SEM image of a fracture surface of a nanotube-epoxy composite loaded with the functionalized nanotubes SWNT-R—$NH_2$ (The bright spots show the broken fragments of nanotube ropes)

After such amino-functionalization, the nanotube surface becomes hydrophilic and capable of hydrogen bonding through the amino functional groups. The morphology of the nanotubes and composites was investigated using a Philips SEM (scanning electron microscope). The SEM image of FIG. 12 shows a mat-like morphology for the functionalized nanotubes, SWNT-R—NH$_2$, before they were loaded into an epoxy matrix. It can be seen that the functionalized SWNTs remain bundles or ropes, some with the sizes larger than 50 nm. This can be due to intermolecular hydrogen bonding or possible crosslinking by diamino functional groups. This interconnection bonding might enhance the affinity single nanotubes have for each other and prevent the sliding of nanotubes within bundles. After fabrication of the nanotube-epoxy polymer composites, the fracture surface of the composite sample was analyzed with SEM. The image in FIG. 13 shows the dispersion and breakage of nanotubes within an epoxy matrix with a 1 wt % loading of functionalized nanotubes. The fracture surface of the composites clearly shows many broken segments of nanotubes ropes rather than nanotubes just pulled out from the surface. Most nanotubes are embedded and tightly held in the matrix. This indicates the existence of strong interfacial bonding between the epoxy and the nanotubes in the composite capable of transferring the stress load and preventing the sliding of nanotubes bundles during tension.

Figure 14:
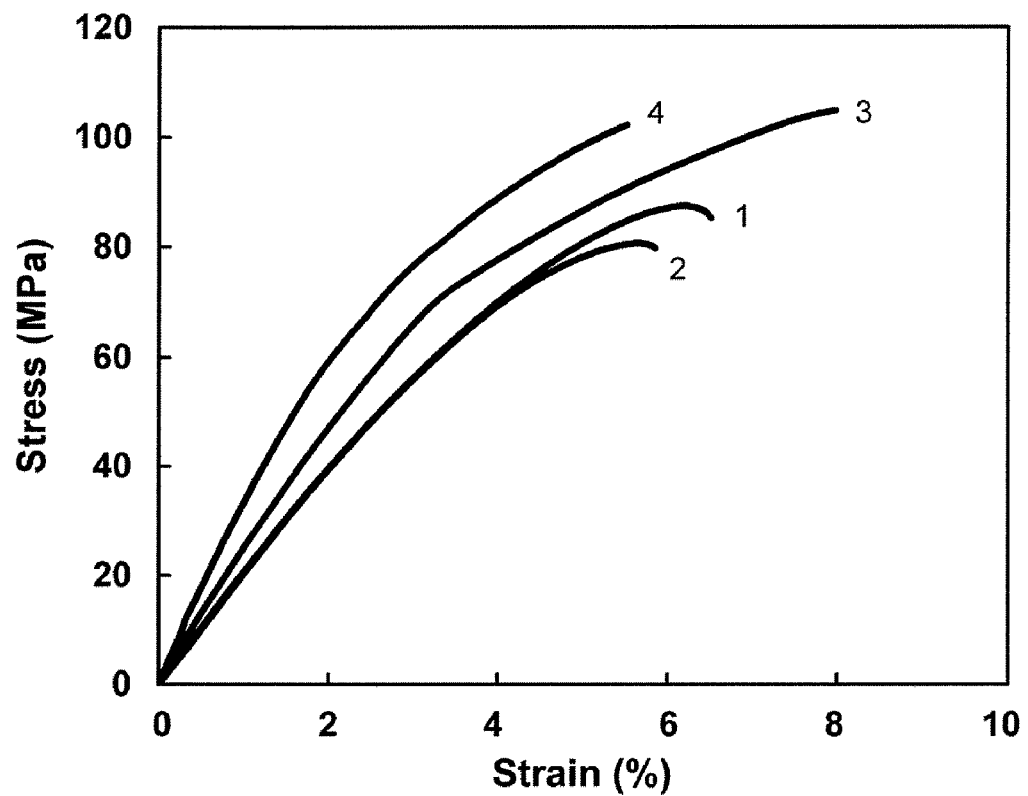
FIG. 14 illustrates tensile stress versus strain curves, wherein trace (1) is pure epoxy, trace (2) is a nanotube-epoxy composite loaded with 1 wt % pristine SWNTs, trace (3) is a nanotube-epoxy composite loaded with 1 wt % SWNT-R—$NH_2$, and trace (4) is a nanotube-epoxy composite loaded with 4 wt % SWNT-R—$NH_2$.

The mechanical properties of fiber-reinforced composites strongly depend on the extent of load transfer between the matrix and fiber. The direct impact of functionalized nanotubes on the mechanical properties of the epoxy polymer has been evaluated by measurements of the tensile strength, Young's modulus, and strain to failure. Epoxy composites with a small loading of functionalized nanotubes showed significant improvement in the mechanical properties as shown in FIG. 14. The average values with standard deviation (shown in brackets) are also listed in Table 2 for comparison. To ensure the data accuracy and repeatability, a minimum five and up to ten specimens from different batches of samples were tested. Relatively higher standard deviation was expected for higher loading (4%) nanotube-epoxy samples because of processing difficulties from very high viscosity and resulting void defect. The average tensile strength at break increased from 83 MPa to 104 MPa, which is 25% higher than for neat EPON 862 epoxy, and a 30% increase over the pristine nanotube-epoxy system. The Young's modulus had a more than 30% improvement at just 1 wt % loading of functionalized nanotubes. For the higher functionalized SWNTs loaded (4 wt %) composites, an up to 70% improvement in Young's modulus was found, although no further increase on ultimate tensile strength was observed.

TABLE 2

Tensile properties of nanotube/epoxy composites

| Epoxy composites formulation | Young's Modulus E (MPa) | Tensile Strength σ (MPa) | Elongation (%) |
|---|---|---|---|
| Neat Epoxy | 2026 (78) | 83 (3.3) | 6.5 (0.17) |
| 1% BuckyPearl SWNTs | 2123 (93) | 79.8 (4.1) | 5.8 (0.33) |
| 1% SWNTs-R-$NH_2$ | 2650 (125) | 104 (3.7) | 8.5 (0.72) |
| 4% SWNTs-R-$NH_2$ | 3400 (253) | 102 (5.4) | 5.5 (0.21) |

It was found that the nanotube-epoxy composite samples containing 1 wt % amino-functionalized nanotubes exhibited an increase in their ultimate elongation of up to 8.5%. This represents a 30% increase relative to the brittle neat epoxy polymer. This is further indicative of the strong reinforcement effect generated by the amino-functionalized nanotubes. This result seems to contradict the general phenomena for conventional fiber reinforced composites, i.e., that the elongation to failure drops drastically when short fibers are added to the matrix [B. D. Agarwal, L. J. Broutman. *Analysis and Performance of Fiber Composites*, John Wiley & Sons, Inc, New York, 1990]. However, carbon nanotubes present a particular form of reinforcing fiber with high aspect ratio and highly flexible elastic behavior during loading, properties that are very different from micro size fibers. Additionally, the curved nanotube ropes are typically twisted and entangled when embedded in a matrix and can, therefore, be continuously stretched. By means of strong interfacial bonding at the molecular level with crosslinked polymer chains, such behavior will contribute to continuous absorption of energy and result in an increased elongation of the epoxy composite [P. M. Ajayan, L. S. Schadler, C. Ciannaris, A. Rubio, *Adv. Mater.* 2000, 12, 750]. This property will be very useful for improving the toughness, fracture toughness and impact resistance of epoxy composites since the usefulness of epoxy systems in composite applications is sometimes limited by their brittle nature. Most current toughening methods, e.g., liquid rubber modification, can effectively increase the toughness, but only with a corresponding sacrifice of other mechanical attributes [N. J. Johnston, *Toughened Composites*, ASTM special technical publication, 1985, 937]. With strong covalent bonding, the functionalized nanotubes can offer extra benefits that increase the strain to failure, and thus will increase the fracture toughness and impact resistance for such composites.

Figure 15:
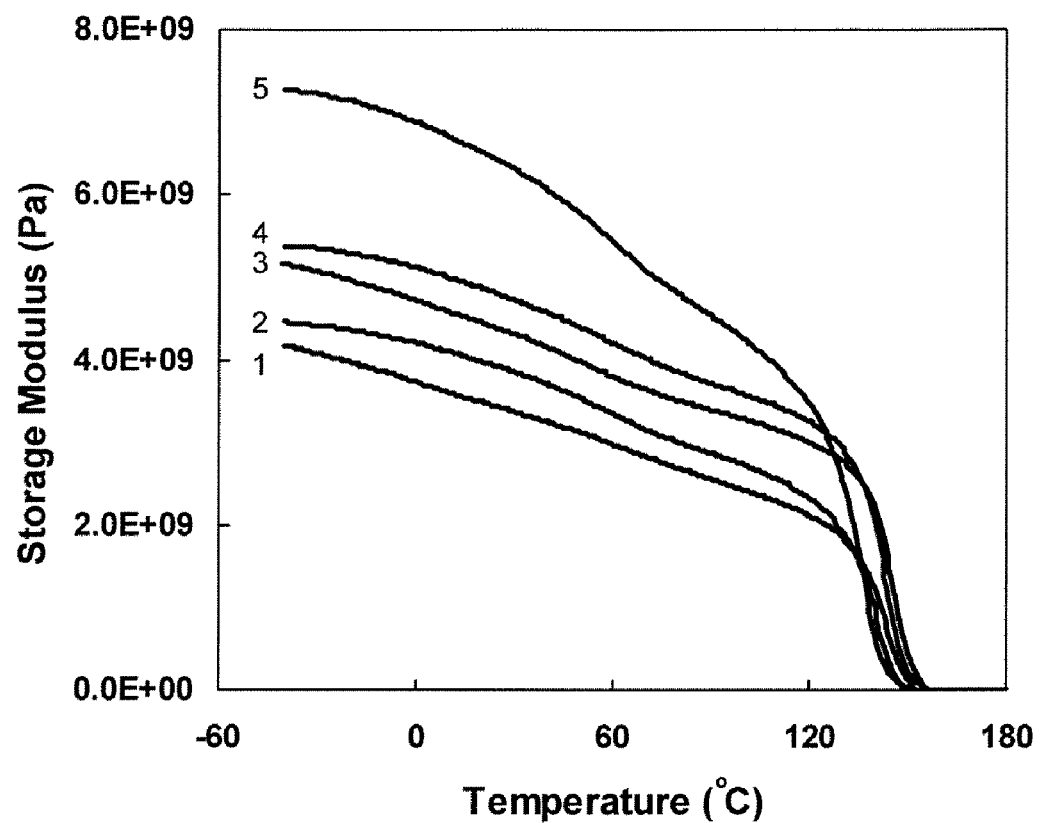
FIG. 15 illustrates the storage modulus (E') of (1) the pure epoxy polymer, and nanotube-epoxy composites loaded with (2) 1 wt % pristine SWNTs, (3) 4 wt % pristine SWNTs, (4) 1 wt % SWNT-R—$NH_2$, and (5) 4 wt % SWNT-R—$NH_2$, as measured by DMA.

At the higher loading of over 1 wt % nanotubes, the nanotube-epoxy mixture displays significantly increased viscosity, such that porosity is easily introduced into the material during composite sample fabrication. The tensile strength of composites is very sensitive to such defect as porosity, and therefore, a dynamic mechanical analysis (DMA) was also performed to obtain the temperature-dependent properties of materials, such as the storage modulus E', the loss modulus E" and the loss tan δ. These dynamic properties reflect the amount of energy stored in the composites as elastic energy and the amount of energy dissipated during mechanical straining, which are affected significantly by the existence of the fillers: their geometrical characteristics, volume fractions, the dispersion in the matrix, and adhesion between filler and the matrix [L. E. Nielsen, and R. F. Landel, *Mechanical Properties of Polymers and Composites*, Second edition, Marcel Dekker, Inc, 1994]. FIG. 15 shows the storage moduli E' variation versus temperature for several samples during the heating cycle. The composites with functionalized nanotubes show dramatically increased storage moduli compared to the pure epoxy polymer and the composites loaded with pristine nanotubes. For example, at room temperature (25° C.), the storage modulus E' increased from 3.4 GPa for pure epoxy to 6.4 GPa for composites with the higher loading of 4 wt % amino-functionalized SWNTs, which corresponds to a near doubling in the value of the storage modulus. The dynamic measurement provides a more obvious indication of the enhancement of significant mechanical properties by functionalized nanotubes. As shown in FIG. 15 the composite produced by the present invention is both stronger, and stronger at higher temperature, important for higher temperature applications. Applicants have observed that the glass transition temperature (defined as the temperature at which maximum loss tan δ is reached) decreased when the higher loading of functionalized nanotubes was used. While not intending to be bound by theory, this is likely because the SWNTs-R—$NH_2$ used in the present Example provided a large excess of amino groups as utilizable curing agent. As a result, the amine/epoxy ratio exceeded the value required by reaction stoichiometry and the degree of cross-linking in the nanotube-epoxy composite was observed to decrease [L. E. Nielsen, and R. F. Landel, *Mechanical Properties of Polymers and Composites*, Second edition, Marcel Dekker, Inc, 1994].

All increases in strength, modulus and strain observed for the nanotube-epoxy composites reflect the immediate effective load transfer of nanotubes through strong interfacial bonding due to a number of free terminal amino groups covalently attached to the side chains on the nanotubes. Full integration was obtained by direct chemical bonding of these groups to the epoxy matrix. These results support the theoretical and molecular simulation predictions that stress transfer and, correspondingly, the strength of nanotube-polymer composites can be effectively increased through the addition of chemical bonding [S. J. V. Frankland, A. Caglar, D. W. Brenner, and M. Griebel, *J. Phys. Chem. B.* 2002, 106, 3046]. In contrast to the previous Example, where the method of acid treatment followed by the fluorination was used for SWNT functionalization [see also J. Zhu, J. Kim, H. Peng, J. L. Margrave, V. Khabashesku, E. V. Barrera, *Nano Lett.* 2003, 3, 1107], the nanotubes functionalized with the amino terminated moieties appear to offer an increased level of mechanical property enhancement for the nanotube-epoxy polymer composite materials.

It should be mentioned that in this Example, a non-destructive route to sidewall functionalization was employed by adding carboxyl-terminated free radicals to the nanotubes [H. Peng, L. B. Alemany, J. L. Margrave, V. N. Khabashesku, *J. Am. Chem. Soc.* 2003, 125, 15174-15182]. During the first step of such functionalization, control over the duration of the acid treatment was required in order to maintain the nanotube wall integrity. End and/or sidewall carboxylation by using relatively long duration oxidative treatments might destroy the wall integrity and likely affect the tensile strength of both the nanotubes and the epoxy composites made with them.

Conclusions

Applicants have developed composites with enhanced and multifunctional properties, and processing methods for making those composites with epoxies and other systems, with functionalized and unfunctionalized carbon nanotubes. Applicants have developed a fully integrated nanotube-epoxy composite material for structural applications. The process involves carbon nanotube sidewall and end-tip functionalization steps, epoxy composite preparation, and coincident crosslinking reactions to achieve an integration well beyond the conventional composite processing. The amino-functionalization has made the nanotubes very effective crosslinking agents. It has been demonstrated in this Example that the functionalized nanotubes can be incorporated into epoxy composites through the formation of strong covalent bonds formed during the course of epoxy curing reactions and, as a result, become an integral structural component of the crosslinked epoxy system. In this way, single-walled carbon nanotubes can play a reinforcement role in the epoxy polymer matrix. The results disclosed herein demonstrate a heretofore unparalleled degree of improvement in the mechanical properties of such epoxy composites through the integration of functionalized nanotubes into the epoxy system. A number of reactive functional groups are capable of attaching covalently to the nanotubes and achieving full integration in polymers. Therefore, the technology for developing the fully integrated nanotubes-epoxy polymer composites by functionalization can be extended to other polymer systems and provide a variety of hybrid materials.

EXAMPLE 3

This Example serves to illustrate synthetic procedures for preparing functionalized CNTs suitable for use in methods of the present invention. The synthetic procedures described in this Example correspond to the reaction scheme outlined in FIG. 16 which provides for hydroxyl moieties on the CNT. Such hydroxyl moieties can then be reacted with epichlorohydrin to yield CNTs functionalized with epoxide ring moieties. These epoxy-functionalized CNTs can then be covalently integrated with epoxy matrices in accordance with embodiments of the present invention.

Figure 16:
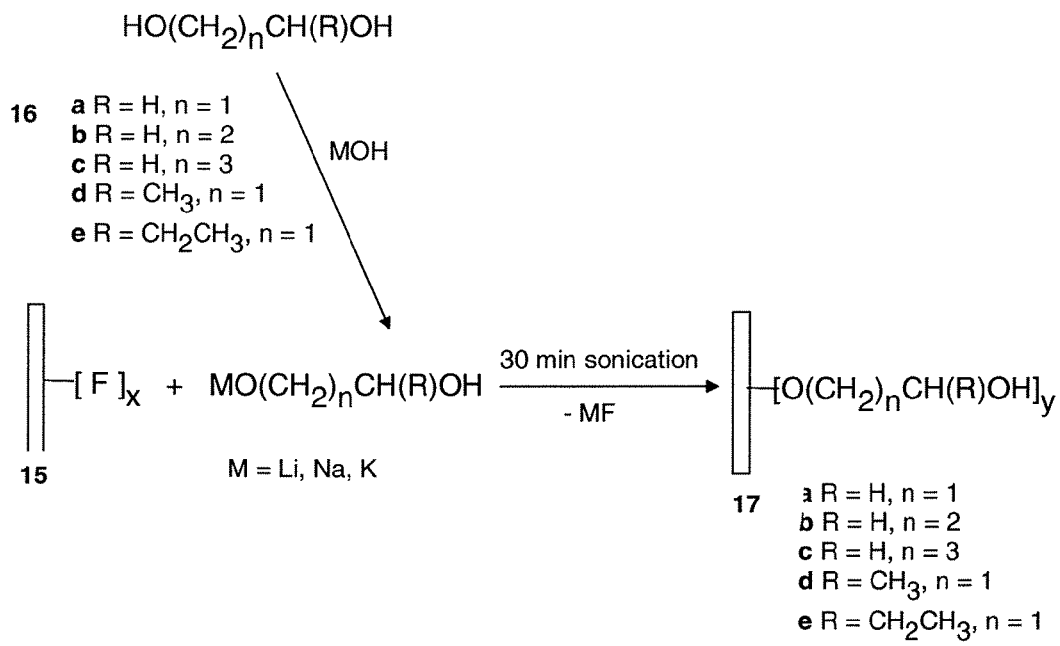
FIGS. 16 A and B illustrate reaction schemes which provide for hydroxyl moieties on CNTs, which can then be reacted with epichlorohydrin in accordance with one or more embodiments of the present invention.
Figure 16:
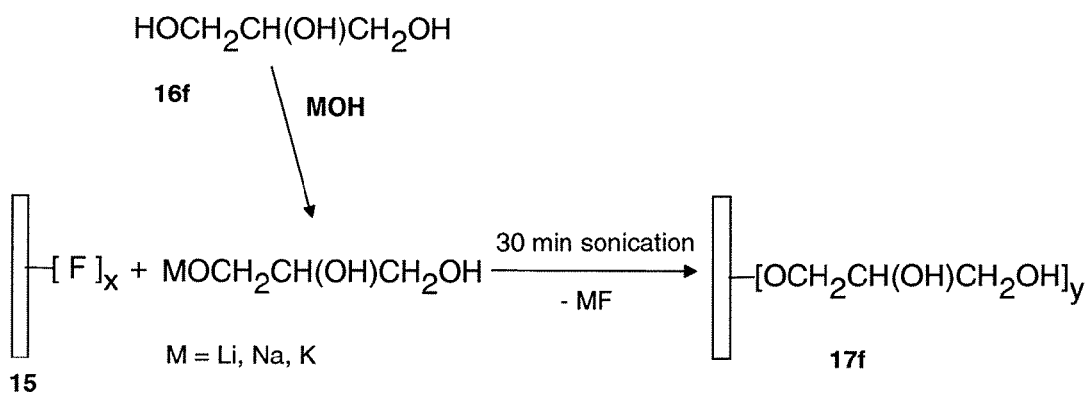

Referring to FIG. 16, for preparation of hydroxyl-nanotubes by this method, 10-15 mg of fluoronanotubes 15 were placed in a vial with 10 ml of corresponding diols or triols 16*a-f* and sonicated (17 W/55 kHz Cole Palmer bath) for 30 min at 80-90° C. in order to achieve a complete dispersion. In a separate vial, 60-80 mg of LiOH (or NaOH or KOH) was sonicated for 30 min in 10 ml of corresponding alkanol until complete dissolution. In the case of diols 16*a-h*, this procedure was carried out at room temperature, while in the case of more viscous glycerol 16*f*, sonication at elevated temperature (80-90° C.) was necessary. In the next step, the solutions from both vials were combined and the resulting mixture sonicated for about 1 hour. The reaction mixture was then filtered through a 1-micron pore size Cole Palmer TEFLON membrane and washed with a large amount of ethanol and water to assure complete removal of LiF (or NaF or KF) and LiOH (or NaOH or KOH) byproducts. The precipitated product, adhering to the membrane as a black-colored film of hydroxyl-nanotubes 17*a-f* was peeled off and dried overnight in vacuum oven at 70° C. Energy dispersive analysis of X-rays (EDAX) elemental analyses showed 3-5 atomic % residual fluorine content in the samples of 17*a-f* derivatives.

EXAMPLE 4

This Example serves to illustrate the fabrication of nanotube enhanced FRP composites by wet lay up and resin infusion processing. The following procedure for nanotube overcoating is of general applicability for infusion processing and different resin and fabric systems.

Preparing Nanotube-Overcoated Fiber

In a first step, nanotubes are dispersed in an organic solvent, like ethanol, which does not harm the fiber and fiber sizing. Solvents must also be selected so as to be easily evaporated off the fabric. The concentration of dispersion/solution is typically ~1 mg/ml. The amount of nanotubes needed is calculated based on the weight ratio of fiber reinforcement. For example, to obtain a 0.1 wt % concentration of nanotubes, 100 mg nanotubes are needed for overcoating 100 g of fiber. The dispersion/solution is sonicated in a bath ultrasonicator (40 KHz) for ~2 hours when using unfunctionalized pristine nanotubes. For functionalized nanotubes, care must be taken during the filtration to keep the nanotube in a consistently wet condition in order to obtain good dispersion in solvents. For functionalized nanotubes, ~30 minute sonication times are used to disperse the functionalized CNTs in solvent. Approximately 1 wt % epoxy resin may be added into the solution to facilitate the attachment of nanotubes to the fiber surface. Various concentrations can be used, but it has been determined that very low concentrations are effective.

Figure 17:
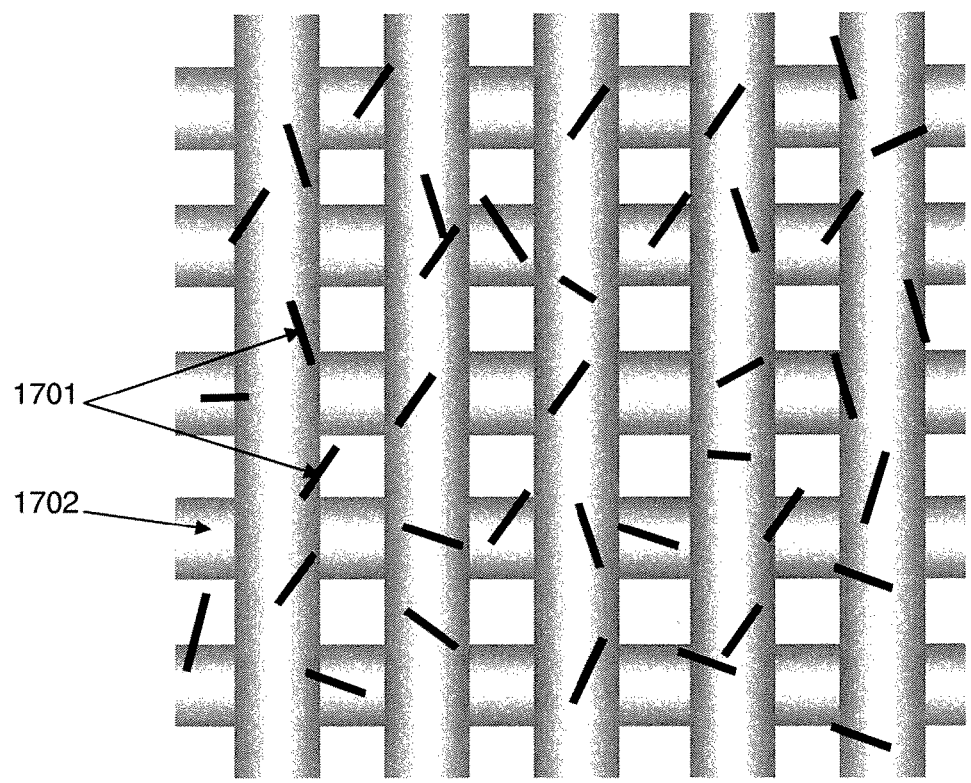
FIG. 17 illustrates how CNTs 1701 can be dispersed onto and adhere to a woven fiber 1702 for susbsequent VARTM processing, in accordance with embodiments of the present invention.

In a second step, a woven fabric or mat is cut into a pre-designated size and shape, and put on aluminum foil in a fumehood with good ventilation. A mist sprayer is used like spray gun to uniformly distribute nanotube dispersions/solutions onto the surface of the fiber in a layer-by-layer fashion-Layers are continually applied until the first applied layer of dispersion/solution becomes dry. All solvents are then evaporated off before subsequent composite processing. The result is as shown in FIG. 17, wherein CNTs 1701 are dispersed onto and adhere to a woven fiber 1702. The scope of the invention also extends to aligning nanotubes with selected fibers or layers of the woven fabric or mat, and to tailoring the amount of nanotubes to achieve the mechanical, electrical or other properties needed in the composite. The dispersions/solutions can also be applied with a bath process.

Fabricating Nanotube Enhanced FRP Composites

Lay up the nanotube overcoated fiber was carried out in the mold with desired plies. For example, ten layers of 24-oz woven glass fiber can be used to obtain a 0.25 inch thick laminated composite. For z-axis property enhancement (such as interlaminar shear strength), only two middle layers are needed when using nanotube-overcoated fiber. In general this is better with only nanotubes at the mid plane, but the nanotube layer can be located anywhere selectively, depending upon where the strength is needed.

Figure 18:
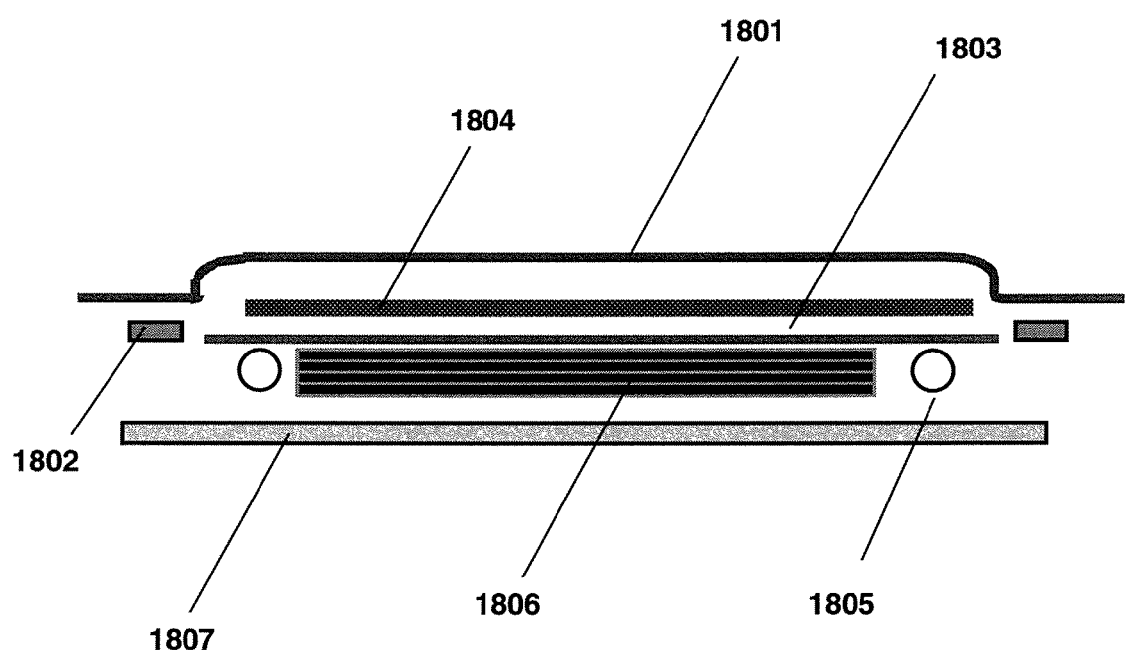
FIG. 18 illustrates a VARTM processing technique in accordance with at least one embodiment of the present invention.

A standard wet lay up or infusion process is applied to fabricate the FRP composites. In, for example, VARTM processing, as shown in FIG. 18, in a mold 1807, a release film 1803 is first placed on the top of fabric lay up 1806, a disperse film 1804 is then applied, a vacuum bag 1801 is placed on the top, the whole set up is sealed with a vacuum sealant 1802. A vacuum gauge is installed to monitor the pressure. Wrapped pipes 1805 are inserted for resin inlet and outlet flow. The outlet is connected to a resin reservoir to collect the resin after the resin has flowed through the fabric. Full vacuum at 30 in Hg is applied and the system is checked for leakage. The resin infusion is then begun at room temperature. After gelation, the vacuum is maintained overnight at 10 in Hg. A postcure is applied if needed. The conditions of the process can be varied to achieve the optimal properties desired. With the methods of the present invention the nanotubes can be well dispersed in the matrix, in the fibermatrix interface or both. The nanotubes can be put on as a top layer, in separated layers or in the mid plane in a controlled manner to provide strength only where most needed and the types of nanotubes can be varied to potimize multifunctionality.

Methods of the present invention include many variations in the processing. The nanotube dispersions/solutions can be applied, or the overcoating can be realized in a number of ways, including but not limited to the use of incipient wetting, a bath, spraying by hand or automatically, continuous bath of plys or the fabric, or continuous bath of selected or single layers of fibers or yarn before weaving or to be used unwoven, or by continuous spraying of selected fibers or layers. It is also envisioned that other additives could be used while applying the nanotube sizing and of applying the nantubes so they come off in the matrix, as well as aplying the nanotubes so they interact with the fibers or matrix or both.

In this invention, nanocomposites are designed where small amounts of nanotubes are added to a glass fiber reinforced system in a way that nanotube dispersion is no longer an issue. In these composites, a small amount of SWNTs serve as a bridge between the polymer matrix and fiber reinforcements and particularly between the composite laminates. SWNTs can be embedded in a thermosetting polymer composite with fiber reinforcement and indirectly coated on to the woven glass fiber by many methods for example, a solvent evaporation method or a spraying method. These prepreg systems can be assembled to make the nanotube reinforced glass fiber epoxy composites or composites of other systems. Nanotubes are used to reinforce the composite matrix and initial steps are taken to optimize dispersion and provide nanotube concentrations necessary for enhancing the composite properties. The method of incipient wetting of nanotubes on fiber systems will likely lead to enhanced mechanical properties of epoxy composite systems SWNTs can be coated on the surface of the glass fiber fabrics by solvent evaporation and simultaneous wetting. Good solvents are selected to achieve good dispersion of SWNTs and to be easily removed by evaporation. DMF from Sigma-Aldrich Chemicals was used to disperse the SWNTs since it showed good dispersion under sonication. SWNTs were sonicated in DMF for 1 hr before coating the woven glass fibers. Each weave was preheated to 150° C. (the boiling point of DMF is 153° C.). As the DMF was removed by evaporation, the SWNTs were physically deposited on the surface of the glass fibers. After coating five glass fiber fabrics with SWNTs, they were dried to remove the DMF completely by heating under vacuum at 140° C. for 24 hours. This mode of dispersion of the nanotubes is called an incipient wetting process and can lead to either a high matrix dispersion of the nanotubes or a strong matrix/glass fiber bonding through the glass fibers.

To enhance adhesion of SWNTs and control the amount of nanotubes on the glass fiber fabrics, a SWNTs/Epoxy can be sized on glass fiber fabrics by spraying SWNTs/DMF/Epoxy prepolymer on preheated glass fiber fabrics, and simultaneous DMF evaporation-Epoxy curing on the glass fiber surface was developed. 1.0 wt. % of SWNTs dispersed in DMF (0.54 mg/L) was homogenized for 5 min. Epon 826 was added in SWNTs/DMF (2.3 mg/L), and sonicated by an ultrasonic processor for 5 min. After cooling down the mixture, a curing agent (0.7 mg/L) was added and sonicated by an ultrasonic processor for 5 min. The SWNTs/Epoxy/DMF mixture was transferred into a spray bottle and kept sonicated in an ultrasonic bath during processing. Glass fiber fabrics were put on the preheated crystalline dish in an oil bath at 165° C. The SWNTs/DMF/Epoxy mixture was sprayed on the front and back sides of 7 glassfiber fabrics. When microdroplets of SWNTs/DMF/Epoxy were contacted on glass fiber fabric, DMF was immediately evaporated by the preheated glass fiber fabric (b.p. of DMF=153°), and the coated epoxy on the glass fibers carrying the SWNTs was cured simultaneously. Coated samples were dried at 100° C. for 24 hr to remove the DMF. Epoxy resin was poured into SWNTs/Epoxy coated 7 layer glassfiber fabrics in the mold, cured at room temperature for 24 hr, and post cured at 100° C. for 1 hr.

Thermosetting resins such as polyester and epoxy are quite brittle if cured without reinforcement. If excess resin exists in the laminate, the laminate will have more of the properties of resin and not be representative of a composite. If too little resin exists, places where the reinforcement is dry will cause weak spots. The vacuum bag method is used to create mechanical pressure on a laminate during its cure cycle to remove trapped air between layers, to compact the fiber layers, to prevent shifting of fiber orientation during cure, to reduce humidity, and to obtain a maximized fiber-to-resin content in the composite by squeezing out excess resin. These advantages have been used to maximize the physical properties of composite materials such as carbon, aramid, and epoxy. The vacuum bag assembly is composed of successive layers of a vacuum bag film, a bleeder/breather cloth, a peel ply, a release film, Epoxy resin/SWNTs/several layers of glassfiber fabrics, and a release film. When the vacuum bag is first sealed, air pressure on the both sides of the barrier equals that of atmospheric pressure. As air is removed from the closed system with a vacuum pump, pressure inside the bag decreases while the outside pressure remains at atmospheric pressure. The vacuum bag method can be modified for low viscous epoxy systems. 5, 7-layer woven glass fiber and epoxy sample was placed on the frame (7.62 cm×8.89 cm) by the hand-layup method. This sample was put into the preheated (50° C.) vacuum oven and vacuum was applied for 10 minutes to remove entrapped air bubbles in the sample, which was then removed and placed into the press. Slightly less than 1 metric ton of pressure was applied on the sample to cure at room temperature for 24 h and post cured at 100° C. for 2 hr. This provides a method for composite processing for samples and by extension for manufacturing.

A SWNTs/Epoxy/glass fiber composite can be made by a vacuum bagging method. 1.0 wt. % of purified SWNTs were mixed with Epon 826/diluent and subsequently mixed with the curing agent. SWNTs/Epoxy was poured into 5 layers of woven glass fiber fabric. The assembly was cured at room temperature for 24 hr, and post-cured at 100° C. for 1 hr. The strength and modulus for the 1.0 wt. % SWNTs/Epoxy/5 layer glass fiber composite decreased 30% and 24%, respectively, indicating poor dispersion of SWNTs in epoxy matrix. During vacuum bagging, excess SWNTs/Epoxy was squeezed out. Therefore, vacuum bagging is further modified to achieve a more economic way to embed SWNTs in the composites by a solvent evaporation method and by using the nanotube spraying method.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
   a) dispersing functionalized CNTs in a solvent to form a dispersion;
      wherein the functionalized CNTs comprise oxidized, fluorinated CNTs;
         wherein the oxidized, fluorinated CNTs are prepared by a process comprising:
            a1) oxidizing unfunctionalized CNTs to form oxidized CNTs comprising opened ends;
               wherein the opened ends comprise carboxylic acid groups; and
            a2) fluorinating the oxidized CNTs to form the oxidized, fluorinated CNTs;
               wherein the fluorinating step is conducted after the oxidizing step; and
               wherein the fluorinating step comprises attaching fluorine moieties to sidewalls of the oxidized CNTs;
   b) adding an epoxy resin to the dispersion to form a mixture;
   c) removing the solvent from the mixture to form a substantially solvent-free mixture;
   d) adding a curing agent to the substantially solvent-free mixture; and
   e) curing the substantially solvent-free mixture to form a CNT-epoxy composite;
   wherein the functionalized CNTs are dispersed and integrated in the CNT-epoxy composite.

2. The method of claim 1, wherein the dispersing step comprises ultrasonication.

3. The method of claim 1, wherein the solvent is selected from the group consisting of aqueous solvents, non-aqueous solvents, and combinations thereof.

4. The method of claim 1, wherein the epoxy resin is selected from the group consisting of DGEBA, Novolac epoxy, cycloaliphatic epoxy, brominated epoxy, and combinations thereof.

5. The method of claim 1, wherein the step of adding an epoxy resin comprises a mixing of the dispersion and the epoxy resin.

6. The method of claim 5, wherein the mixing is conducted with a high-shear mixer.

7. The method of claim 1, wherein the removing step comprises heating in vacuum.

8. The method of claim 1, wherein the curing agent is selected from the group consisting of cycloaliphatic amines, aliphatic amines, aromatic amines, and combinations thereof.

9. The method of claim 1, wherein the step of adding a curing agent comprises a mixing of the curing agent and the substantially solvent-free mixture.

10. The method of claim 1, wherein the unfunctionalized CNTs comprise SWNTs.

11. The method of claim 1, wherein the CNT-epoxy composite possesses at least one enhanced property selected from the group consisting of mechanical properties, thermal properties, electrical properties, and combinations thereof; and
   wherein the at least one enhanced property is measured relative to a native epoxy not comprising CNTs.

12. The method of claim 11, wherein the at least one enhanced mechanical property is selected from the group consisting of an increase in Young's modulus, an increase in tensile strength, an enhanced elongation-to-break, an enhanced load transfer to the functionalized CNTs, and combinations thereof.

13. The method of claim 1, wherein the unfunctionalized CNTs comprise a carbon nanotube type selected from the group consisting of single-wall carbon nanotubes, multi-wall carbon nanotubes, double-wall carbon nanotubes, fullerene tubes, Buckytubes, graphite fibrils, and combinations thereof.

14. The method of claim 1, further comprising purifying the unfunctionalized CNTs before the oxidizing step.

15. The method of claim 1, further comprising sorting the unfunctionalized CNTs by a property;
   wherein the property is selected from the group consisting of length, diameter, chirality, conductivity, and combinations thereof; and
   wherein the sorting step takes place before the oxidizing step.

16. The method of claim 1 further comprising reacting the oxidized, fluorinated CNTs with at least one diamine to form oxidized, amino-functionalized CNTs;
   wherein the at least one diamine comprises a first amino group and a second amino group;
   wherein the step of reacting comprises displacing the fluorine moieties and bonding first amino groups of the at least one diamine to sidewalls of the oxidized, fluorinated CNTs; and
   wherein second amino groups of the at least one diamine are not bonded to sidewalls of the oxidized, fluorinated CNTs.

17. The method of claim 1, wherein the oxidized, amino-functionalized CNTs integrate into the CNT-epoxy composite during the curing step;
   wherein the at least one diamine comprises the curing agent; and
   wherein integration comprises a reaction of second amino groups of the at least one diamine with epoxide groups of the epoxy resin.

18. The method of claim 1, wherein the oxidized, fluorinated CNTs integrate into the CNT-epoxy composite during the curing step;
   wherein integration comprises forming ester linkages between the oxidized, fluorinated CNTs and the epoxy resin;

wherein the ester linkages are formed by a reaction between the carboxylic acid groups and epoxide groups of the epoxy resin.

19. A method comprising the steps of:
a) dispersing functionalized CNTs in a first solvent to form a dispersion of functionalized CNTs;
   wherein the functionalized CNTs comprise sidewall carboxylic acid-functionalized CNTs;
   wherein the sidewall carboxylic acid-functionalized CNTs are prepared by a process comprising:
      a1) dispersing unfunctionalized CNTs in a second solvent to form a dispersion of unfunctionalized CNTs;
      a2) adding an organic acyl peroxide of a dicarboxylic acid to the dispersion of unfunctionalized CNTs to form a reaction mixture; and
      a3) heating the reaction mixture to form free radicals;
         wherein the free radicals are of the type HO(O)C—$(CH_2)_n$—; and
         wherein the free radicals react with sidewalls of the unfunctionalized CNTs to form the sidewall carboxylic acid-functionalized CNTs;
b) adding an epoxy resin to the dispersion of functionalized CNTs to form an epoxy mixture;
c) removing the first solvent from the epoxy mixture to form a substantially solvent-free mixture;
d) adding a curing agent to the substantially solvent-free mixture; and
e) curing the substantially solvent-free mixture to form a CNT-epoxy composite;
wherein the functionalized CNTs are dispersed and integrated in the CNT-epoxy composite.

20. The method of claim 19, wherein the unfunctionalized CNTs comprise a carbon nanotube type selected from the group consisting of single-wall carbon nanotubes, multi-wall carbon nanotubes, double-wall carbon nanotubes, fullerene tubes, Buckytubes, graphite fibrils, and combinations thereof.

21. The method of claim 19, further comprising purifying the unfunctionalized CNTs before step a1.

22. The method of claim 19, further comprising sorting the unfunctionalized CNTs by a property;
wherein the property is selected from the group consisting of length, diameter, chirality, conductivity and combinations thereof; and
wherein the sorting step takes place before step a1.

23. The method of claim 19, wherein the organic acyl peroxide of the dicarboxylic acid is selected from the group consisting of succinic acid peroxide, glutaric acid peroxide, and combinations thereof.

24. The method of claim 19, further comprising reacting the sidewall carboxylic acid-functionalized CNTs with a chlorinating agent to form sidewall acyl chloride-functionalized CNTs.

25. The method of claim 24, wherein the chlorinating agent is selected from the group consisting of $Cl_2$, $SOCl_2$, and combinations thereof.

26. The method of claim 24, further comprising reacting the sidewall acyl chloride-functionalized CNTs with a diamine to form amino-functionalized CNTs;
wherein the diamine comprises a first amino group and a second amino group;
wherein reacting the sidewall acyl chloride-functionalized CNTs with the diamine comprises bonding first amino groups of the diamine with the sidewall acyl chloride-functionalized CNTs to form amides; and
wherein the amides are terminated with second amino groups of the diamine.

27. The method of claim 26, wherein the amino-functionalized CNTs are-integrated into the CNT-epoxy composite during the curing step;
wherein integration comprises a reaction of second amino groups of the diamine with epoxide groups of the epoxy resin.

28. The method of claim 24, wherein the sidewall acyl chloride-functionalized CNTs are-integrated into the CNT-epoxy composite during the curing step;
wherein the curing agent comprises a diamine;
wherein the diamine comprises a first amino group and a second amino group; and
wherein integration comprises a first reaction of first amino groups of the diamine with the sidewall acyl chloride-functionalized CNTs to form amides and a second reaction of second amino groups of the diamine with epoxide groups of the epoxy resin.

29. The method of claim 19, wherein the sidewall carboxylic acid-functionalized CNTs integrate into the CNT-epoxy composite during the curing step;
wherein integration comprises forming ester linkages between the sidewall carboxylic acid-functionalized CNTs and the epoxy resin;
wherein the ester linkages are formed by a reaction between the carboxylic acid groups and epoxide groups of the epoxy resin.

30. A method comprising the steps of:
a) dispersing functionalized CNTs in a first solvent to form a dispersion of functionalized CNTs;
   wherein the functionalized CNTs comprise fluorinated, hydroxyl-functionalized CNTs;
      wherein the fluorinated, hydroxyl-functionalized CNTs are prepared by a process comprising:
         a1) reacting unfunctionalized CNTs with fluorine to form fluorinated CNTs;
         a2) dispersing the fluorinated CNTs in a second solvent to form a dispersion of fluorinated CNTs;
         a3) reacting a dialcohol with a metal hydroxide to form a metal salt of the dialcohol; and
         a4) reacting the metal salt of the dialcohol with the fluorinated CNTs to form the fluorinated, hydroxyl-functionalized CNTs;
b) adding an epoxy resin to the dispersion of functionalized CNTs to form a mixture;
c) removing the first solvent from the mixture to form a substantially solvent-free mixture;
d) adding a curing agent to the substantially solvent-free mixture; and
e) curing the substantially solvent-free mixture to form a CNT-epoxy composite;
wherein the functionalized CNTs are dispersed and integrated in the CNT-epoxy composite.

31. The method of claim 30, further comprising reacting the fluorinated, hydroxyl-functionalized CNTs with epichlorohydrin to form flourinated, epoxide-functionalized CNTs.

32. The method of claim 31, wherein the fluorinated, epoxide-functionalized CNTs integrated into the CNT-epoxy composite during the curing step;
wherein the curing agent comprises at least one amine; and
wherein integration comprises a reaction between the at least one amine comprising the curing agent and epoxide groups comprising the fluorinated, epoxide-functionalized CNTs.

33. The method of claim 30, wherein the unfunctionalized CNTs comprise a carbon nanotube type selected from the group consisting of single-wall carbon nanotubes, multi-wall carbon nanotubes, double-wall carbon nanotubes, fullerene tubes, Buckytubes, graphite fibrils, and combinations thereof.

34. The method of claim 30, further comprising purifying the unfunctionalized CNTs before step a1.

35. The method of claim 30, further comprising sorting the unfunctionalized CNTs by a property;
wherein the property is selected from the group consisting of length, diameter, chirality, conductivity, and combinations thereof; and
wherein the sorting step takes place before the oxidizing step.

36. The method of claim 30, wherein the dialcohol comprises bisphenol-A.

37. The method of claim 30, wherein the metal hydroxide is selected from the group consisting of LiOH, NaOH, KOH, and combinations thereof.

38. A CNT-epoxy polymer composite prepared by a process comprising the steps of:
a) dispersing functionalized CNTs in a solvent to form a dispersion;
wherein the functionalized CNTs comprise oxidized, fluorinated CNTs;
wherein the oxidized, fluorinated CNTs are prepared by a process comprising:
a1) oxidizing unfunctionalized CNTs to form oxidized CNTs comprising opened ends;
wherein the opened ends comprise carboxylic acid groups; and
a2) fluorinating the oxidized CNTs to form the oxidized, fluorinated CNTs;
wherein the fluorinating step is conducted after the oxidizing step; and
wherein the fluorinating step comprises attaching fluorine moieties to sidewalls of the oxidized CNTs;
b) adding an epoxy resin to the dispersion to form a mixture;
c) removing the solvent from the mixture to form a substantially solvent-free mixture;
d) adding a curing agent to the substantially solvent-free mixture; and
e) curing the substantially solvent-free mixture to form the CNT-epoxy polymer composite;
wherein the functionalized CNTs are dispersed and integrated in the CNT-epoxy polymer composite.

39. The CNT-epoxy polymer composite prepared by the process of claim 38, wherein the dispersing step comprises ultrasonication.

40. The CNT-epoxy polymer composite prepared by the process of claim 38, wherein the solvent is selected from the group consisting of aqueous solvents, non-aqueous solvents, and combinations thereof.

41. The CNT-epoxy polymer composite prepared by the process of claim 38, wherein the epoxy resin is selected from the group consisting of DGEBA, Novolac epoxy, cycloaliphatic epoxy, brominated epoxy, and combinations thereof.

42. The CNT-epoxy polymer composite prepared by the process of claim 38, wherein the step of adding an epoxy resin comprises a mixing of the dispersion and the epoxy resin.

43. The CNT-epoxy polymer composite prepared by the process of claim 42, wherein the mixing is conducted with a high-shear mixer.

44. The CNT-epoxy polymer composite prepared by the process of claim 38, wherein the removing syep comprises heating in vacuum.

45. The CNT-epoxy polymer composite prepared by the process of claim 38, wherein the curing agent is selected from the group consisting of cycloaliphatic amines, aliphatic amines, aromatic amines, and combinations thereof.

46. The CNT-epoxy polymer composite prepared by the process of claim 38, wherein the step of adding a curing agent comprises a mixing of the curing agent and the substantially solvent-free mixture.

47. The CNT-epoxy polymer composite prepared by the process of claim 38, wherein the functionalized CNTs comprise SWNTs.

48. The CNT-epoxy polymer composite prepared by the process of claim 38, wherein the CNT-epoxy polymer composite possesses at least one enhanced mechanical property;
wherein the at least one enhanced mechanical property is measured relative to a native epoxy not comprising CNTs.

49. The CNT-epoxy polymer composite prepared by the process of claim 48, wherein the at least one enhanced mechanical property is selected from the group consisting of an increase in Young's modulus, an increase in tensile strength, an enhanced elongation-to-break, an enhanced load transfer to the functionalized CNTs, and combinations thereof.

50. The CNT-epoxy polymer composite prepared by the process of claim 38, wherein the unfunctionalized CNTs comprise a carbon nanotube type selected from the group consisting of single-wall carbon nanotubes, multi-wall carbon nanotubes, double-wall carbon nanotubes, fullerene tubes, Buckytubes, graphite fibrils, and combinations thereof.

51. The CNT-epoxy polymer composite prepared by the process of claim 38, wherein the process further comprises reacting the oxidized, fluorinated CNTs with at least one diamine to form oxidized, amino-functionalized CNTs;
wherein the at least one diamine comprises a first amino group and a second amino group;
wherein the step of reacting comprises displacing the fluorine moieties and bonding first amino groups of the at least one diamine to sidewalls of the oxidized, fluorinated CNTs; and
wherein second amino groups of the at least one diamine are not bonded to sidewalls of the oxidized, fluorinated CNTs.

52. The CNT-epoxy polymer composite prepared by the process of claim 51, wherein the oxidized, fluorinated CNTs integrate into the CNT-epoxy polymer composite during the curing step;
wherein the at least one diamine comprises the curing agent;
wherein the at least one diamine comprises a first amino group and a second amino group; and
wherein integration comprises a reaction of second amino groups of the at least one diamine with epoxide groups of the epoxy resin.

53. The CNT-epoxy polymer composite prepared by the process of claim 38, wherein the oxidized, fluorinated CNTs integrate into the CNT-epoxy polymer composite during the curing step; and
wherein integration comprises-by forming ester linkages between the oxidized, fluorinated CNTs and the epoxy resin;
wherein the ester linkages are formed by a reaction between the carboxylic acid groups and epoxide groups of the epoxy resin.

54. The CNT-epoxy polymer composite prepared by the process of claim 38, further comprising at least one additive selected from the group consisting of inhibitors, curing agents, viscosity modifiers, anti-degradation species, colorants, nanoparticles, nanoclays, and combinations thereof.

55. The CNT-epoxy polymer composite prepared by the process of claim 38, further comprising a fiber reinforcement selected from the group consisting of fiberglass, carbon fiber, graphite fabric, KEVLAR, and combinations thereof.

56. A CNT-epoxy polymer composite prepared by a process comprising the steps of:
a) dispersing functionalized CNTs in a first solvent to form a dispersion of functionalized CNTs;
   wherein the functionalized CNTs comprise sidewall carboxylic acid-functionalized CNTs;
      wherein the sidewall carboxylic acid-functionalized CNTs are prepared by a process comprising:
         a1) dispersing unfunctionalized CNTs in a second solvent to form a dispersion of unfunctionalized CNTs;
         a2) adding an organic acyl peroxide of a dicarboxylic acid to the dispersion of unfunctionalized CNTs to form a reaction mixture; and
         a3) heating the reaction mixture to form free radicals; wherein the free radicals are of the type HO(O)C—$(CH_2)_n$—; and
            wherein the free radicals react with sidewalls of the unfunctionalized CNTs to form the sidewall carboxylic acid-functionalized CNTs;
b) adding an epoxy resin to the dispersion of functionalized CNTs to form an epoxy mixture;
c) removing the first solvent from the epoxy mixture to form a substantially solvent-free mixture;
d) adding a curing agent to the substantially solvent-free mixture; and
e) curing the substantially solvent-free mixture to form the CNT-epoxy polymer composite;
wherein the functionalized CNTs are dispersed and integrated in the CNT-epoxy polymer composite.

57. The CNT-epoxy polymer composite prepared by the process of claim 56, wherein the unfunctionalized CNTs comprise a carbon nanotube type selected from the group consisting of single-wall carbon nanotubes, multi-wall carbon nanotubes, double-wall carbon nanotubes, fullerene tubes, Buckytubes, graphite fibrils, and combinations thereof.

58. The CNT-epoxy polymer composite prepared by the process of claim 56, wherein the process further comprises reacting the sidewall carboxylic acid-functionalized CNTs with a chlorinating agent to form sidewall acyl chloride-functionalized CNTs.

59. The CNT-epoxy polymer composite prepared by the process of claim 58, wherein the process further comprises reacting the sidewall acyl chloride-functionalized CNTs with a diamine to form amino-functionalized CNTs;
   wherein the diamine comprises a first amino group and a second amino group;
   wherein reacting the sidewall acyl chloride-functionalized CNTs with the diamine comprises bonding first amino groups of the diamine with the sidewall acyl chloride-CNTs to form amides; and
   wherein the amides are terminated with second amino groups of the diamine.

60. The CNT-epoxy polymer composite prepared by the process of claim 59, wherein the amino-functionalized CNTs are-integrated into the CNT-epoxy polymer composite during the curing step;
   wherein integration comprises a reaction of second amino groups of the diamine with epoxide groups of the epoxy resin.

61. The CNT-epoxy polymer composite prepared by the process of claim 58, wherein the sidewall acyl chloride-functionalized CNTs are-integrated into the CNT-epoxy polymer composite during the curing step;
   wherein the curing agent comprises a diamine;
   wherein the diamine comprises a first amino group and a second amino group; and
   wherein integration comprises a first reaction of first amino groups of the diamine with the sidewall acyl chloride-functionalized CNTs to form amides and a second reaction of second amino groups of the diamine with epoxide groups of the epoxy resin.

62. The CNT-epoxy polymer composite prepared by the process of claim 56, wherein the sidewall carboxylic acid-functionalized CNTs integrate into the CNT-epoxy polymer composite during the curing step;
   wherein integration comprises forming ester linkages between the sidewall carboxylic acid-functionalized CNTs and the epoxy resin;
   wherein the ester linkages are formed by a reaction between the carboxylic acid groups and epoxide groups of the epoxy resin.

63. The CNT-epoxy polymer composite prepared by the process of claim 56, further comprising at least one additive selected from the group consisting of inhibitors, curing agents, viscosity modifiers, anti-degradation species, colorants, nanoparticles, nanoclays, and combinations thereof.

64. The CNT-epoxy polymer composite prepared by the process of claim 56, further comprising a fiber reinforcement selected from the group consisting of fiberglass, carbon fiber, graphite fabric, KEVLAR, and combinations thereof.

65. A CNT-epoxy polymer composite prepared by a process comprising the steps of:
a) dispersing functionalized CNTs in a first solvent to form a dispersion of functionalized CNTs;
   wherein the functionalized CNTs comprise fluorinated, hydroxyl-functionalized CNTs;
      wherein the fluorinated, hydroxyl-functionalized CNTs are prepared by a process comprising:
         a1) reacting unfunctionalized CNTs with fluorine to form fluorinated CNTs;
         a2) dispersing the fluorinated CNTs in a second solvent to form a dispersion of fluorinated CNTs;
         a3) reacting a dialcohol with a metal hydroxide to form a metal salt of the dialcohol; and
         a4) reacting the metal salt of the dialcohol with the fluorinated CNTs to form the fluorinated, hydroxyl-functionalized CNTs;
b) adding an epoxy resin to the dispersion of functionalized CNTs to form a mixtures;
c) removing the first solvent from the mixture to form a substantially solvent-free mixture;
d) adding a curing agent to the substantially solvent-free mixture; and
e) curing the substantially solvent-free mixture to form the CNT-epoxy polymer composite;
wherein the functionalized CNTs are dispersed and integrated in the CNT-epoxy polymer composite.

66. The CNT-epoxy polymer composite prepared by the process of claim 65, wherein the process further comprises reacting the fluorinated, hydroxyl-functionalized CNTs with epichlorohydrin to form fluorinated, epoxide-functionalized CNTs.

67. The CNT-epoxy polymer composite prepared by the process of claim 66, wherein the fluorinated, epoxide-functionalized CNTs are integrated into the CNT-epoxy polymer composite during the curing step;
 wherein the curing agent comprises at least one amine; and
 wherein integration comprises a reaction between the at least one amine comprising the curing agent and epoxide groups comprising the fluorinated, epoxide-functionalized CNTs.

68. The CNT-epoxy polymer composite prepared by the process of claim 65, wherein the unfunctionalized CNTs comprise a carbon nanotube type selected from the group consisting of single-wall carbon nanotubes, multi-wall carbon nanotubes, double-wall carbon nanotubes, fullerene tubes, Buckytubes, graphite fibrils, and combinations thereof.

69. The CNT-epoxy polymer composite prepared by the process of claim 65, wherein the dialcohol comprises bisphenol-A.

70. The CNT-epoxy polymer composite prepared by the process of claim 65, further comprising at least one additive selected from the group consisting of inhibitors, curing agents, viscosity modifiers, anti-degradation species, colorants, nanoparticles, nanoclays, and combinations thereof.

71. The CNT-epoxy polymer composite prepared by the process of claim 65, further comprising a fiber reinforcement selected from the group consisting of fiberglass, carbon fiber, graphite fabric, KEVLAR, and combinations thereof.

* * * * *

UNITED STATES PATENT AND TRADEMARK OFFICE
CERTIFICATE OF CORRECTION

| | | |
|---|---|---|
| PATENT NO. | : 7,601,421 B2 | |
| APPLICATION NO. | : 10/559905 | |
| DATED | : October 13, 2009 | |
| INVENTOR(S) | : Khabashesku et al. | |

It is certified that error appears in the above-identified patent and that said Letters Patent is hereby corrected as shown below:

On the title page,

[*] Notice:   Subject to any disclaimer, the term of this patent is extended or adjusted under 35 U.S.C. 154(b) by 518 days.

Delete the phrase "by 518 days" and insert -- by 827 days --

Signed and Sealed this

Twenty-ninth Day of June, 2010

David J. Kappos
*Director of the United States Patent and Trademark Office*